United States Patent
Yi et al.

(10) Patent No.: US 12,526,724 B2
(45) Date of Patent: Jan. 13, 2026

(54) INFORMATION TRANSCEIVING METHOD, DATA TRANSMISSION METHOD AND APPARATUSES THEREOF

(71) Applicant: 1FINITY Inc., Kawasaki (JP)

(72) Inventors: Su Yi, Beijing (CN); Yang Lu, Beijing (CN); Meiyi Jia, Beijing (CN)

(73) Assignee: 1FINITY Inc., Kawasaki (JP)

( * ) Notice: Subject to any disclaimer, the term of this patent is extended or adjusted under 35 U.S.C. 154(b) by 244 days.

(21) Appl. No.: 18/370,432

(22) Filed: Sep. 20, 2023

(65) Prior Publication Data
US 2024/0015633 A1  Jan. 11, 2024

Related U.S. Application Data

(63) Continuation of application No. PCT/CN2021/084790, filed on Mar. 31, 2021.

(51) Int. Cl.
*H04W 40/22* (2009.01)
*H04L 45/02* (2022.01)
*H04W 40/04* (2009.01)

(52) U.S. Cl.
CPC .............. *H04W 40/22* (2013.01); *H04L 45/02* (2013.01); *H04W 40/04* (2013.01)

(58) Field of Classification Search
CPC ...... H04W 40/222; H04W 40/04; H04L 45/02
USPC ....................................................... 370/235
See application file for complete search history.

(56) References Cited

U.S. PATENT DOCUMENTS

| | | | |
|---|---|---|---|
| 2021/0051512 A1* | 2/2021 | Hampel | H04W 40/22 |
| 2021/0058826 A1 | 2/2021 | Mao et al. | |
| 2021/0127351 A1* | 4/2021 | Stojanovski | H04W 48/16 |
| 2023/0106809 A1* | 4/2023 | Wu | H04W 28/0289 370/229 |

FOREIGN PATENT DOCUMENTS

| | | |
|---|---|---|
| CN | 110536351 A | 12/2019 |
| CN | 112398589 A | 2/2021 |

OTHER PUBLICATIONS

Notice of Reasons for Refusal issued by the Japan Patent Office for corresponding Japanese Patent Application No. 2023-559856, mailed on Sep. 17, 2024, with an English translation.
International Search Report and Written Opinion of the International Searching Authority issued by the China National Intellectual Property Administration for corresponding International Patent Application No. PCT/CN2021/084790, mailed on Dec. 30, 2021, with English translation.

(Continued)

*Primary Examiner* — Anthony Mejia
(74) *Attorney, Agent, or Firm* — Myers Wolin, LLC

(57) ABSTRACT

An information transceiving apparatus, applicable to a first IAB-donor-node, includes a transmitter configured to transmit a first message to a second IAB-donor-node, the first message comprising a BAP address of a first node in topology of the first IAB-donor-node, and a receiver configured to receive a second message transmitted by the second IAB donor node, the second message comprising a BAP Routing ID in topology of the second IAB donor node, and a processor configured to configure BAP routing entries for nodes in its topology according to the second message.

19 Claims, 16 Drawing Sheets

(56) References Cited

OTHER PUBLICATIONS

LG Electronics, Inc., "Open Issues on topological redundancy for IAB", Agenda Item: 13.2.3, 3GPP TSG-RAN WG3 Meeting #110-e, R3-206072, E-Meeting, Nov. 2-12, 2020.
ZTE et al., "Considerations on topology adaptation enhancements in IAB", Agenda Item: 8.4.3, 3GPP TSG-RAN WG2 Meeting #113 electronic, R2-2101283, Online, Jan. 25-Feb. 5, 2021.
LG Electronics, Inc., "Considerations on topological redundancy for IAB", Agenda Item: 13.2.3, 3GPP TSG-RAN WG3 Meeting #111-e, R3-210536, E-Meeting, Jan. 25-Feb. 4, 2021.
3GPP TS 38.300 V16.2.0, "3rd Generation Partnership Project; Technical Specification Group Radio Access Network; NR; NR and NG-RAN Overall Description; Stage 2 (Release 16)", Jul. 2020.
3GPP TS 38.340 V16.2.0, "3rd Generation Partnership Project; Technical Specification Group Radio Access Network; NR; Backhaul Adaptation Protocol (BAP) specification (Release 16)", Sep. 2020.
The Extended European search report with the Supplementary European search report and the European search opinion, issued by the European Patent Office for corresponding European Patent Application No. 21933911.6, mailed on Mar. 18, 2024.
Qualcomm Incorporated, "IAB enhancements for inter-donor topological redundancy", Agenda Item: 13.2.3, 3GPP TSG-RAN WG3 Meeting #110-e, R3-206258, E-meeting, Nov. 2-12, 2020.
SAMSUNG (moderator), "Summary of offline discussion on topology redundancy", Agenda Item: 13.2.3 (Topology Redundancy), 3GPP TSG-RAN WG3 #110-e, R3-207101, Online, Nov. 2-12, 2020.

\* cited by examiner

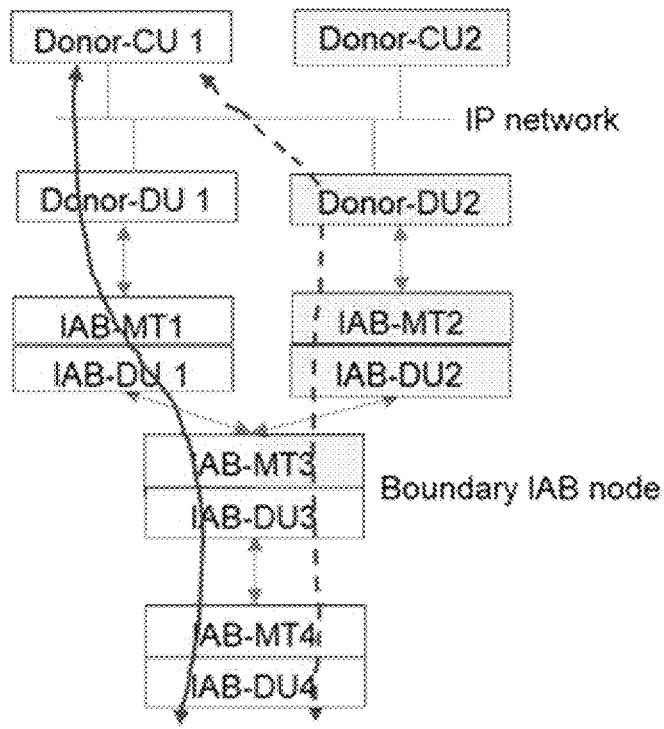

Fig. 3

401 a second message transmitted by a second IAB-donor-node is received by the first IAB donor node, the second message including a BAP address of a second node in topology of the second IAB-donor-node and/or a second path ID in topology of the second IAB-donor-node and/or a first virtual BAP address of a first node in topology of the first IAB-donor-node; and/or, a first message is transmitted by the first IAB-donor-node to the second IAB-donor-node, the first message including a BAP address of a first node in topology of the first IAB-donor-node

402 a routing table is configured by the first IAB-donor-node for nodes in its topology

Fig. 4

501 a second message is transmitted by the second IAB-donor-node to the first IAB-donor-node, the second message including a BAP address of a second node in topology of the second IAB-donor-node and/or a second path ID in topology of the second IAB-donor-node and/or a first virtual BAP address of a first node in topology of the first IAB-donor-node; and/or, a first message is received by the second IAB-donor-node transmitted by the first IAB-donor-node, the first message including a BAP address of a first node in topology of the first IAB-donor-node

502 a routing table is configured by the second IAB-donor-node for nodes in its topology

Fig. 5

601 — the second message is transmitted by the second IAB-donor-node to the first IAB-donor-node, the second message including a BAP address of a second node in topology of the second IAB-donor-node and/or a second path ID in the topology of the second IAB-donor-node

602 — the first message is transmitted by the first IAB-donor-node to the second IAB-donor-node, the first message including a BAP address of the first node in the topology of the first IAB-donor-node

603 — routing tables are configured by the first IAB-donor-node and the second IAB-donor-node for nodes in their respective topologies

604 — a BAP address is allocated by the first IAB-donor-node to an IAB-node within its topology according to the second message, and a BAP address is allocated by the second IAB-donor-node to an IAB-node within its topology according to the first message

605 — information on a mapping relationship from each uplink traffic type initiated by the fourth IAB-node to the BAP routing identifier is configured by the first IAB-donor-node for the fourth IAB-node, and is transmitted to the fourth IAB-node

606 — routing mapping relationship configuration information is transmitted by the first IAB-donor-node to the third IAB-node

Fig. 6

1301 a third IAB-node receives, routing mapping relationship configuration information transmitted by a first IAB-donor-node, the routing mapping relationship configuration information indicating a correspondence between a first routing identifier as an ingress routing identifier within a topology domain of the first IAB-donor-node and a second routing identifier as an egress routing identifier in a topology domain of a second IAB-donor-node; or, the routing mapping relationship configuration information indicating a correspondence between a second routing identifier as an ingress routing identifier within a topology domain of a second IAB-donor-node and a first routing identifier as an egress routing identifier in a topology domain of the first IAB-donor-node

Fig. 13

1401 the fourth IAB node receives, routing table information transmitted by a first IAB-donor-node, the routing table information including a routing identifier, the routing identifier including a BAP address of a second node in topology of a second IAB-donor-node and a first path identifier in topology of the first IAB-donor-node, or, the routing identifier including the above-described second virtual BAP address and the first path identifier

Fig. 14

INFORMATION TRANSCEIVING METHOD, DATA TRANSMISSION METHOD AND APPARATUSES THEREOF

CROSS REFERENCE TO RELATED APPLICATION

This application is a continuation application of International Application PCT/CN2021/084790 filed on Mar. 31, 2021, and designated the U.S., the entire contents of which are incorporated herein by reference.

TECHNICAL FIELD

This disclosure relates to the field of communication technologies.

BACKGROUND

Integrated access and backhaul (IAB) realizes a function of wireless relay in a next generation radio access network (NG-RAN). An integrated access and backhaul node (IAB-node) supports access and backhaul via New Radio (NR). A termination point of NR backhaul at a network side is referred to as an IAB-donor, which denotes a network device (e.g. a gNB) supporting an IAB function.

IAB-nodes are connected to an IAB-donor via one or more hops. These multi-hop connections form a directed acyclic graph (DAG) topology with an IAB-donor as a root node. The IAB-donor is responsible for executing centralized resource management, topology management and routing management in an IAB network topology.

The IAB-node supports a function of a gNB-DU (distributed unit), an IAB-node DU is also referred to as an IAB-DU, which is an end point of a New Radio access (NR access) interface to a terminal equipment (UE) and a next hop of IAB-node, and is also an end point of an F1 protocol to a gNB-CU (central unit) on the IAB-donor. The IAB-DU may serve for a common UE and IAB child node.

In addition to the gNB-DU function, the IAB-node also supports some functions of the UE, referred to as an IAB-MT (mobile termination). The IAB-MT includes, for example, a physical layer, layer 2, RRC (radio resource control) layer and NAS (non-access stratum) layer functions to be connected to a gNB-DU on another IAB-node or IAB-donor, gNB-CU on the IAB-donor and a core network. The IAB-MT may support such functions as a UE physical layer, an access stratum (AS), a radio resource control (RRC) layer and a non-access stratum (NAS) layer functions, and may be connected to the IAB parent node.

FIG. 1 is a schematic diagram of the IAB topology. As shown in FIG. 1, 5G multi-hop IAB network is deployed, a plurality of UEs connect to IAB-donor via multi-hop IAB node and then access to 5G network. In IAB topology 10, an IAB-node 100 includes an IAB-MT functional unit 101 and an IAB-DU functional unit 102, neighboring nodes of a previous hop of the IAB-MT are referred to as parent nodes, such as parent nodes 301 and 302 shown in FIG. 1, and the IAB-MT functional unit 101 may be in communication with the parent nodes 301 and 302 via an air interface (Uu). Neighboring nodes on a next hop of the IAB-DU are referred to as child nodes, such as child nodes 201, 202 and 203 shown in FIG. 1, the IAB-DU functional unit 102 may be in communication with the child nodes 201, 202 and 203 via an air interface (Uu).

As shown in FIG. 1, a direction from IAB-node 100 to child nodes 201, 202 and 203 is referred to as a downstream direction, and a direction from IAB-node 100 to parent nodes 301 and 302 is referred to as an upstream direction. And the IAB-donor (not shown) executes centralized resource, topology and routing management for the IAB topology 10.

In order to support multi-hop routing forwarding of packets, IAB has introduced a backhaul adaptation protocol (BAP) sublayer. The BAP sublayer is located above a radio link control RLC sublayer and below a network protocol IP layer, and supports such functions as packet destination node and path selection, packet routing forwarding, bearer mapping, flow control feedback, and link failure notification, etc.

In a multi-hop scenario, in order to realize relay forwarding of packets, an IAB-node needs to determine a destination node at which the packets arrive, and then determines a next hop of node corresponding to the destination node according to a BAP routing table and transmits. When the packets arrive at the next hop of node, the next hop of node needs to further look up the routing table to determine a further next hop of node of the arrived destination node, until the packets are transmitted to the destination node.

It should be noted that the above description of the background art is merely provided for clear and complete explanation of this disclosure and for easy understanding by those skilled in the art. And it should not be understood that the above technical solution is known to those skilled in the art as it is described in the background art of this disclosure.

SUMMARY OF THE DISCLOSURE

Currently, in order to achieve load balancing of traffics, a scheme of inter-donor topology redundancy is proposed, which means that when there are too much traffics in a topology network managed by an IAB-donor-CU, some of the traffics may be offloaded to a topology network managed by another donor-CU, that is, data transmission is performed via redundant paths.

However, it was found by the inventors that establishment and release of redundant paths may be performed in IAB topology under the same IAB-donor-CU in an existing intra-CU topology redundancy process, that is, existing BAP routings are all managed and configured by the donor-CU of the local topology network. There is currently no solution about how to achieve BAP routing management and configuration across topologies (controlled by different donor-CUs).

In order to solve at least one of the above problems, embodiments of this disclosure provide an information transceiving method, data transmission method and apparatuses thereof.

According to an aspect of the embodiments of this disclosure, there is provided an information transceiving apparatus, applicable to a first IAB-donor-node, the apparatus including:

- a first receiving unit configured to receive a second message transmitted by a second IAB-donor-node, the second message comprising a BAP address of a second node in topology of the second IAB-donor-node and/or a second path ID in topology of the second IAB-donor-node and/or a first virtual BAP address of a first node in topology of the first IAB-donor-node; and/or,
- a first transmitting unit configured to transmit a first message to the second IAB-donor-node, the first message comprising a BAP address of a first node in topology of the first IAB-donor-node; and
- a first configuring unit configured to configure a routing table for nodes in its topology.

According to another aspect of the embodiments of this disclosure, there is provided an information transceiving apparatus, applicable to a second IAB-donor-node, the apparatus including:

- a fourth transmitting unit configured to transmit a second message to a first IAB-donor-node, the second message comprising a BAP address of a second node in topology of the second IAB-donor-node and/or a second path ID in topology of the second IAB-donor-node and/or a first virtual BAP address of a first node in topology of the first IAB-donor-node; and/or,
- a second receiving unit configured to receive a first message transmitted by the first IAB-donor-node, the first message comprising a BAP address of a first node in topology of the first IAB-donor-node; and
- a second configuring unit configured to configure a routing table for nodes in its topology.

According to a further aspect of the embodiments of this disclosure, there is provided a data transmission apparatus, applicable to a third IAB-node, the apparatus including:

- a third receiving unit configured to receive a BAP packet;
- a rewriting unit configured to perform routing ID rewriting on a BAP header in the BAP packet according to routing mapping relationship configuration information when a predetermined condition is satisfied, wherein the rewriting unit replaces a routing ID in the BAP header with an egress routing ID in the routing mapping relationship configuration information; and
- a forwarding unit configured to forward the rewritten BAP packet.

An advantage of the embodiments of this disclosure exists in that related information on BAP addresses of nodes (real BAP addresses and/or virtual BAP addresses) and/or path identities within respective topologies may be exchanged between donor-nodes, and/or boundary IAB-nodes rewrite BAP headers (sub-header), of BAP packets needing to be forwarded to replace routing IDs in the BAP headers (sub-header), so as to achieve concatenating of BAP route in at least two topologies. Thus, cross-topology BAP routing management and configuration may be achieved, that is, inter-donor topology redundancy BAP routing may be supported in the IAB network, thereby achieving inter-donor load balancing, alleviating traffic overload of a donor, and optimizing network performances.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the spirits and scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiments.

FIG. 3 is a schematic diagram of an inter-donor topology redundancy transmission path of the embodiment of this disclosure;

FIG. 4 is a schematic diagram of the information transceiving method of an embodiment of this disclosure;

FIG. 5 is another schematic diagram of the information transceiving method of the embodiment of this disclosure;

FIG. 6 is a further schematic diagram of the information transceiving method of the embodiment of this disclosure;

FIG. 13 is further another schematic diagram of the information transceiving method of the embodiment of this disclosure;

FIG. 14 is yet further another schematic diagram of the information transceiving method of the embodiment of this disclosure;

DETAILED DESCRIPTION OF THE DISCLOSURE

Figure 1:
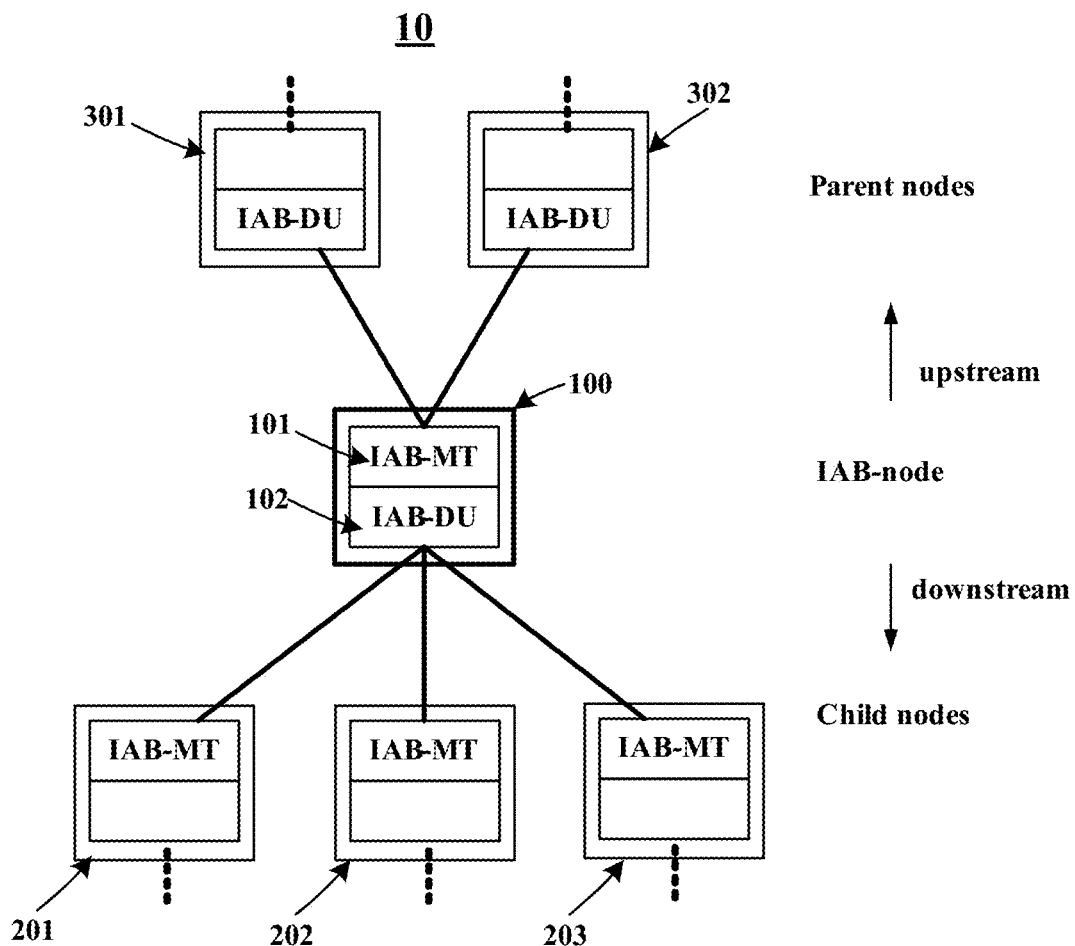
FIG. 1 is a schematic diagram of an IAB topology of an embodiment of this disclosure.

These and further aspects and features of this disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the spirit and terms of the appended claims.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not be defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

In the embodiments of this disclosure, the term "communication network" or "wireless communication network" may refer to a network satisfying any one of the following communication standards: long term evolution (LTE), long term evolution-advanced (LTE-A), wideband code division multiple access (WCDMA), and high-speed packet access (HSPA), etc.

And communication between devices in a communication system may be performed according to communication protocols at any stage, which may, for example, include but not limited to the following communication protocols: 1G (generation), 2G, 2.5G, 2.75G, 3G, 4G, 4.5G, and 5G and New Radio (NR) in the future, etc., and/or other communication protocols that are currently known or will be developed in the future.

In the embodiments of this disclosure, the term "network device", for example, refers to a device in a communication system that accesses a user equipment to the communication network and provides services for the user equipment. The network device may include but not limited to the following devices: a node and/or donor in an IAB architecture, a base station (BS), an access point (AP), a transmission reception point (TRP), a broadcast transmitter, a mobile management entity (MME), a gateway, a server, a radio network controller (RNC), a base station controller (BSC), etc.

Wherein, the base station may include but not limited to a node B (NodeB or NB), an evolved node B (eNodeB or eNB), and a 5G base station (gNB), etc. Furthermore, it may include a remote radio head (RRH), a remote radio unit (RRU), a relay, or a low-power node (such as a femto, and a pico, etc.). The term "base station" may include some or all of its functions, and each base station may provide communication coverage for a specific geographical area. And a term "cell" may refer to a base station and/or its coverage area, depending on a context of the term. Without causing confusion, terms "cell" and "base station" are interchangeable.

In the embodiments of this disclosure, the term "user equipment (UE)" or "terminal equipment (TE) or terminal device" refers to, for example, an equipment accessing to a communication network and receiving network services via a network device. The terminal equipment may be fixed or mobile, and may also be referred to as a mobile station (MS), a terminal, a subscriber station (SS), an access terminal (AT), and a station, etc.

The terminal equipment may include but not limited to the following devices: a cellular phone, a personal digital assistant (PDA), a wireless modem, a wireless communication device, a hand-held device, a machine-type communication device, a lap-top, a cordless telephone, a smart cell phone, a smart watch, and a digital camera, etc.

For another example, in a scenario of the Internet of Things (IoT), etc., the user equipment may also be a machine or a device performing monitoring or measurement. For example, it may include but not limited to a machine-type communication (MTC) terminal, a vehicle mounted communication terminal, a device to device (D2D) terminal, and a machine to machine (M2M) terminal, etc.

Moreover, the term "network side" or "network device side" refers to a side of a network, which may be a base station or one or more network devices including those described above. The term "user side" or "terminal side" or "terminal equipment side" refers to a side of a user or a terminal, which may be a UE, and may include one or more terminal equipments described above. In this text, "device" may refer to a network device, and may also refer to a terminal equipment, except otherwise specified.

Figure 2:
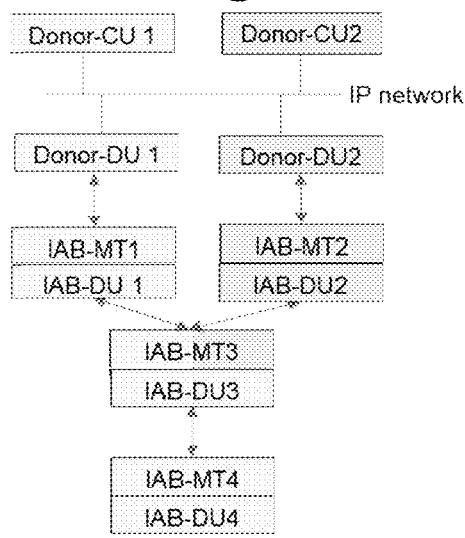
FIG. 2 is a schematic diagram of an inter-donor topology redundancy network structure of the embodiment of this disclosure.

Currently, 3GPP has achieved inter-donor topology redundancy (or inter-CU topology redundancy) for an IAB-node by supporting the following two scenarios. In principle, one IAB-DU may only have an F1 interface with one donor-CU. FIG. 2 is a schematic diagram of an inter-donor topology redundancy network structure.

Scenario 1: there are a plurality of connections between the IAB-node and two donors. For example, as shown in FIG. 2, IAB-node 3 is connected to donor-CU1 and donor-CU2 at the same time.

Scenario 2: a parent/ancestor node of the IAB-node has/have a plurality of connections to two donors simultaneously. As shown in FIG. 2, for IAB-node 4, its parent node connected to donor-CU1 and donor-CU2 at the same time. It may possibly not be shown in FIG. 2 that, for example, there are a plurality of nodes for multi-hop connections between IAB-node 3 and IAB-node 4, hence, IAB-node 4 still belongs to this scenario and may support inter-donor topology redundancy. Taking FIG. 2 as an example, IAB-node 3 is referred to as a boundary IAB-node. The boundary IAB-node is accessed to two parent nodes respectively connected to different donor-CUs. The descendant IAB-node refers to a node accessed to the network via the boundary IAB-node, such as IAB-node 4. An F1-terminating node refers to a donor-CU terminating an F1 interface of the boundary IAB-node and the descendant IAB-node, such as donor-CU1. A non-F1-terminating node refers to a CU having a function of a donor and not terminating the F1 interface of the boundary IAB-node and the descendant IAB-node, such as donor-CU2.

A main purpose of topology redundancy is to achieve load balancing of traffics by using diversity of paths, so as to improve network robustness. When traffic offloading is needed, a donor where an F1 interface is terminated initiates traffic offloading to other donors. For example, when there is too much traffics in a topology network managed by IAB-donor-CU1 itself, partial traffics may be offloaded to a topology network managed by donor-CU2, that is, performing data transmission via redundant paths. F1 interfaces of the boundary IAB-node and its descendant IAB-nodes are all terminated to the same donor.

FIG. 3 is a schematic diagram of an inter-donor topology redundancy transmission path. In FIG. 3, donor-CU1 is an F1 terminating donor of IAB-node 4. Some data between IAB-node 4 and donor-CU1 are transmitted via a topology network controlled by donor-CU1 (as shown by the solid arrow), while some data are transmitted via a topology network controlled by donor-CU2 (as shown by the dashed arrow), thereby achieving a purpose of data offloading and load balancing.

Establishment and release of redundant paths may be performed in IAB topology under the same IAB-donor-CU in an existing intra-CU topology redundancy process, that is, existing BAP routings are all managed and configured by the donor-CU of the local topology network. There is currently no solution to achieve BAP routing management and configuration across topologies (controlled by different donor-CUs).

It was found by the inventors that a problem existing in an existing cross-topology BAP routing management and configuration scheme is that as a BAP routing identifier of an IAB-node within topology managed by a donor is configured by a donor-CU, BAP routing identifiers (or BAP addresses) of IAB-nodes in topologies managed by different donors may conflict, or the BAP routing identifiers (or path identifiers) cannot be correctly resolved in cross-topology (i.e. inter-donor) BAP routing, which may result in cross-topology routing failure.

In response to at least one of the above problems, in the embodiments of this disclosure, related information on BAP addresses of nodes (real BAP addresses and/or virtual BAP addresses) and/or path identifiers within their respective topologies may be exchanged between donors, which may achieve cross-topology BAP routing management and configuration, avoid cross-topology routing failures, and BAP address spaces and path identifier spaces controlled by donor-nodes will not be restricted.

In response to at least one of the above problems, in the embodiments of this disclosure, boundary IAB-nodes rewrite BAP headers of BAP packets needing to be forwarded to replace routing IDs in the BAP headers, so as to achieve concatenating of BAP route in at least two topologies.

The embodiments of this disclosure shall be further described below. In the embodiments of this disclosure, "when . . . ", "in a case where . . . ", "for a case where . . . " and "if . . . " represent being based on one or some conditions or states, etc. In addition, these expressions are interchangeable. In addition, "indication" may be explicitly containing some information for notification, or implicitly notifying via certain features, etc.

Embodiments of a First Aspect

The embodiments of this disclosure provides an information transceiving method. FIG. 4 is a schematic diagram of the information transceiving method of the embodiment of this disclosure, which shall be described from a side of a first IAB-donor-node (an F1-terminating node of an IAB-node needing to establish inter-donor topology redundancy). As shown in FIG. 4, the method includes:

401: a second message transmitted by a second IAB-donor-node is received by the first IAB donor node, the second message including a BAP address of a second node in topology of the second IAB-donor-node and/or a second path ID in topology of the second IAB-donor-node and/or a first virtual BAP address of a first node in topology of the first IAB-donor-node; and/or, a first message is transmitted by the first IAB-donor-node to the second IAB-donor-node, the first message including a BAP address of a first node in topology of the first IAB-donor-node; and

402: a routing table is configured by the first IAB-donor-node for nodes in its topology.

FIG. 5 is a schematic diagram of the information transceiving method of the embodiment of this disclosure, which shall be described from a side of the second IAB-donor-node (a non-F1-terminating node of an IAB-node needing to establish inter-donor topology redundancy). As shown in FIG. 5, the method includes:

501: a second message is transmitted by the second IAB-donor-node to the first IAB-donor-node, the second message including a BAP address of a second node in topology of the second IAB-donor-node and/or a second path ID in topology of the second IAB-donor-node and/or a first virtual BAP address of a first node in topology of the first IAB-donor-node; and/or, a first message is received by the second IAB-donor-node transmitted by the first IAB-donor-node, the first message including a BAP address of a first node in topology of the first IAB-donor-node; and

502: a routing table is configured by the second IAB-donor-node for nodes in its topology.

In some embodiments, the first IAB-donor-node is an F1-terminating donor-node of an IAB-node needing to establish inter-donor topology redundancy, such as donor-CU1 i.e. a donor-CU initiating traffic offloading. The second IAB-donor-node is a non-F1-terminating donor-node of the IAB-node needing to establish inter-donor topology redundancy, such as donor-CU2, i.e. a donor-CU bearing offloaded traffics. The number of the second IAB-donor-node may be one or at least two, that is, the cross topology may be cross two topologies or a plurality of topologies, and the embodiments of this disclosure is not limited thereto.

In some embodiments, a node within the donor-node topology refers to that a DU portion of the node (including an IAB-DU and an IAB-donor-DU) is managed by the donor-CU, that is, the F1 interface of the node is terminated at the donor CU.

In some embodiments, related information on BAP addresses of nodes (real BAP addresses and/or virtual BAP addresses) and/or path identifiers within their respective topologies may be exchanged between the first IAB-donor-node and the second IAB-donor-node. The above information or identifiers may be included in the first message or the second message, and the first message or the second message may be carried by Xn interface application protocol (XnAP) signaling, which may be, for example, an existing message or a newly-established message in the XnAP signaling, and the embodiments of this disclosure is not limited thereto.

In some embodiments, the first node and second node may be destination nodes of BAP packets within their respective topologies, i.e. nodes to which DESTINATION fields in headers of the BAP packets correspond, such as uplink destination nodes or downlink destination nodes, as will be explained later.

In some embodiments, the BAP address may be used by each IAB-node on the backhaul path to determine that the packet has arrived at the destination node, the BAP address is also referred to as a destination in the header of the BAP packet. The first IAB-donor-node and/or the second IAB-donor-node may allocate BAP addresses for IAB-nodes in its/their topology/topologies, and transmit(s) allocation information containing the BAP address to the IAB-nodes, and reference may be made to existing techniques for details. The path identifier may be used to identify a routing path via which the packet arrives at the destination node.

The information transceiving method shall be described below by taking uplink redundant path transmission and downlink redundant path transmission as examples.

(I) For Uplink Redundant Path Transmission

FIG. 6 is a schematic diagram of the information transceiving method. As shown in FIG. 6, the method includes:

601: the second message is transmitted by the second IAB-donor-node to the first IAB-donor-node, the second message including a BAP address of a second node in topology of the second IAB-donor-node and/or a second path ID in the topology of the second IAB-donor-node;

602 (optional): the first message is transmitted by the first IAB-donor-node to the second IAB-donor-node, the first message including a BAP address of the first node in the topology of the first IAB-donor-node; and 603: routing tables are configured by the first IAB-donor-node and the second IAB-donor-node for nodes in their respective topologies.

In some embodiments, when the uplink data are transmitted by using an inter-donor redundant path, the second node is a destination node of an uplink BAP sublayer of the redundant path, a DESTINATION field of BAP headers of BAP packets from an access IAB-node and from a forwarded intermediate IAB-node is a BAP address of donor-DU2 via which the redundant path passes. The BAP address of the second node is the BAP address of donor-DU2 within the topology of the second IAB-donor-node, and the BAP address of the first node is the BAP address of donor DU1 within the topology of the first IAB-donor-node. The number of the first node (donor DU1) and/or the second node (donor DU2) may be one or more. Therefore, in 601 and 602, BAP addresses of respective one or more donor DUs are exchanged between the first IAB-donor-node and the second IAB-donor-node. Wherein, 601 and 602 may be executed in an early stage of the network, or 601 and/or 602 may be executed when inter-donor path redundancy is needed to be established (i.e. traffic offloading is needed), and the embodiments of this disclosure is not limited thereto. For example, if address exchange is performed when traffic offloading is needed to be performed, 602 may be omitted.

In some embodiments, the method may further include:

604: a BAP address is allocated by the first IAB-donor-node to an IAB-node within its topology according to the second message, and a BAP address is allocated by the second IAB-donor-node to an IAB-node within its topology according to the first message.

In some embodiments, the first IAB-donor-node takes the second message into account in allocating the BAP address to the IAB-node within its topology, thereby avoiding collision between the allocated BAP address and the BAP address of donor DU2. Likewise, the second IAB-donor-node takes the first message into account in allocating the BAP address to the IAB-node within its topology, thereby avoiding collision between the allocated BAP address and the BAP address of donor-DU1.

Figure 7:
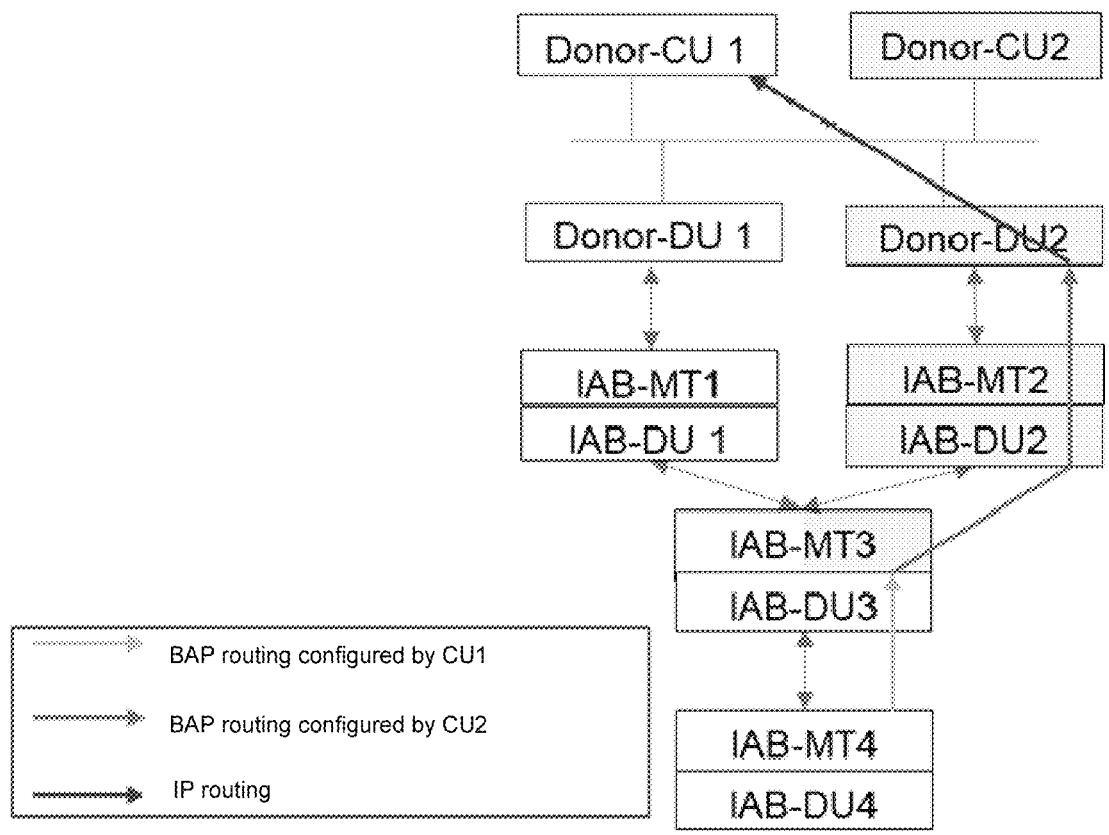
FIG. 7 is a schematic diagram of an uplink BAP routing of inter-donor topology redundancy of the embodiment of this disclosure.

In some embodiments, in 601, the second IAB-donor-node may further transmit the second path identifier within the topology of the second IAB-donor-node to the first IAB-donor-node. The second path refers to a path from the boundary IAB-node to the second node, i.e. a path specified by the second IAB-donor-node within the topology of the second IAB-donor-node. FIG. 7 is a schematic diagram of an uplink BAP routing of inter-donor topology redundancy. As shown in FIG. 7, the second path is a path from IAB-node 3 to donor-DU2.

In some embodiments, in 603, the first IAB-donor-node configures a BAP routing table for the IAB-node within its topology (such as a descendant IAB-node of the boundary IAB-node, hereinafter referred to as a fourth IAB-node, and IAB-node 4 is taken as an example). The BAP routing table is used by the IAB-nodes within the topology to determine a next hop of node of the packet, and contains a next hop of node of data forwarding arriving at each IAB-node and the donor-DU. Table 1 is an example of a routing table of IAB-node 4. As shown in Table 1, the routing table includes a mapping relationship between the routing identifier and a BAP address of the next hop of node. The routing identifier includes a BAP address of a second node (such as donor-DU2) and a first path identifier in the topology of the first IAB-donor-node. The first path refers to a path from the fourth IAB-node to the boundary IAB-node, that is, a path in the topology of the first IAB-donor-node specified by the first IAB-donor-node. As shown in FIG. 7, the first path is a path from IAB-node 4 to IAB-node 3. The second IAB-donor-node configures a routing table for the nodes in its topology, and reference may be made to existing techniques for details, which shall not be repeated herein any further.

TABLE 1

| Routing table | | |
|---|---|---|
| Destination address | Path identifier | Next hop |
| Donor-DU2 containing a BAP address | 1 | IAB-node 3 containing a BAP address |
| Donor-DUI containing a BAP address | 2 | IAB-node 3 containing a BAP address |
| Donor-DU1 containing a BAP address | 3 | IAB-node 3 containing a BAP address |
| IAB-node 5 containing a BAP address | 4 | IAB-node 6 containing a BAP address |
| . . . | . . . | . . . |

In some embodiments, the method may further include:

605: information on a mapping relationship from each uplink traffic type initiated by the fourth IAB-node to the BAP routing identifier is configured by the first IAB-donor-node for the fourth IAB-node, and is transmitted to the fourth IAB-node.

In some embodiments, when the first IAB-donor-node establishes an F1 tunnel for uplink transmission via a redundant path for the fourth IAB-node (such as IAB-node 4 shown in the figure), in order for the fourth IAB-node as an access IAB-node to select a BAP routing identifier corresponding to the redundant path, the BAP routing identifier in the mapping relationship includes the BAP address of the second node.

For example, when the traffic type is F1-U Tunnel, the corresponding routing identifier is included in UE Context Setup of F1AP signaling from a gNB CU to a gNB DU or a BH information IE in an information element (IE) UL UP TNL Information to be setup List in a UE Context Modification procedure.

For example, when the traffic type is Non-UP Traffic, the corresponding routing identifier is included in F1 Setup Response of F1AP signaling from a gNB CU to a gNB DU, or in BH information IE in a gNB-DU Configuration Update Acknowledge message or gNB-CU Configuration Update message.

In some embodiments, the method may further include:

606: routing mapping relationship configuration information is transmitted by the first IAB-donor-node to the third IAB-node, the routing mapping relationship configuration information indicating a correspondence between a first routing identifier as an ingress routing identifier in the topology of the first IAB-donor-node and a second routing identifier as an egress routing identifier in the topology of the second IAB-donor-node.

In some embodiments, the third IAB-node is a boundary IAB-node (such as IAB-node 3 shown in the figure), which is dual-connected to the first IAB-donor-node and the second IAB-donor-node. After receiving the routing mapping relationship configuration information, the third IAB-node rewrites the BAP header by using the routing mapping relationship configuration information, implementation of the rewriting being going to be explained in the embodiments of the second aspect. The first routing identifier may be deemed as an ingress routing identifier on the boundary IAB-node, and the second routing identifier may be deemed as an egress routing identifier on the boundary IAB-node. The ingress and egress are referenced relative to a direction of data transmission, and data enter the boundary IAB-node from the ingress and flow out the boundary IAB-node from the egress. In other words, a routing identifier used before the data arriving at the boundary IAB-node is the first routing identifier, and a routing identifier used after the data is transmitted from the boundary IAB-node is the second routing identifier.

In some embodiments, the first routing identifier includes the BAP address of the second node and the first path identifier within the topology of the first IAB-donor-node. The second routing identifier includes the BAP address of the second node and the second path identifier, wherein the second path refers to a path from the boundary IAB-node to donor-DU2, that is, a path in the topology of the second IAB-donor-node specified by the second IAB-donor-node. The first path refers to a path from the fourth IAB-node to the boundary IAB-node, that is, a path in the topology of the first IAB-donor-node specified by the first IAB-donor-node, and details are as described above, which shall not be repeated herein any further.

Or, alternatively, the first routing identifier includes the BAP address of the second node and does not include the first path identifier, and the second routing identifier includes the BAP address of the second node and the second path identifier.

In some embodiments, in the routing mapping relationship configuration information, that the routing identifier does not include the path identifier may refer to the path identifier is not configured, or the path identifier is empty, or the path identifier is 0 or a specific value, etc., and the embodiments of this disclosure is not limited thereto.

In some embodiments, the routing mapping relationship configuration information may include at least one item (entry) of mapping relationship between an ingress routing identifier and an egress routing identifier, each item (entry) of mapping relationship being able to be identified by an index.

In some embodiments, the routing mapping relationship configuration information is carried by F1AP signaling. For example, a new message may be established to carry the routing mapping relationship configuration information, or an existing message may be used to carry addition or removal of the routing mapping relationship configuration information. For example, a new information element BAP Routing ID Mapping in an existing message BAP Mapping Configuration is used to denote the routing mapping relationship configuration information. Table 2 is an example of the routing mapping relationship configuration information. As shown in Table 2:

TABLE 2

Routing mapping relationship configuration information

| Information element/Name of group | Existence | Range | Description |
|---|---|---|---|
| BAP Routing ID mapping info Item >Mapping Information Index | Necessary | 1 . . . <maximum mapping items> | |
| >Ingress BAP Routing ID | Optional | | Denoting a routing identifier(ID) needing to be rewritten |
| >Egress BAP Routing ID | Optional | | Denoting a routing identifier (ID) used to write in a header |

Wherein, Ingress BAP Routing ID denotes an ingress routing identifier, Egress BAP Routing ID denotes an egress routing identifier, and Mapping Information Index denotes a mapping information index.

(II) For Uplink Redundant Path Transmission

Figure 8:
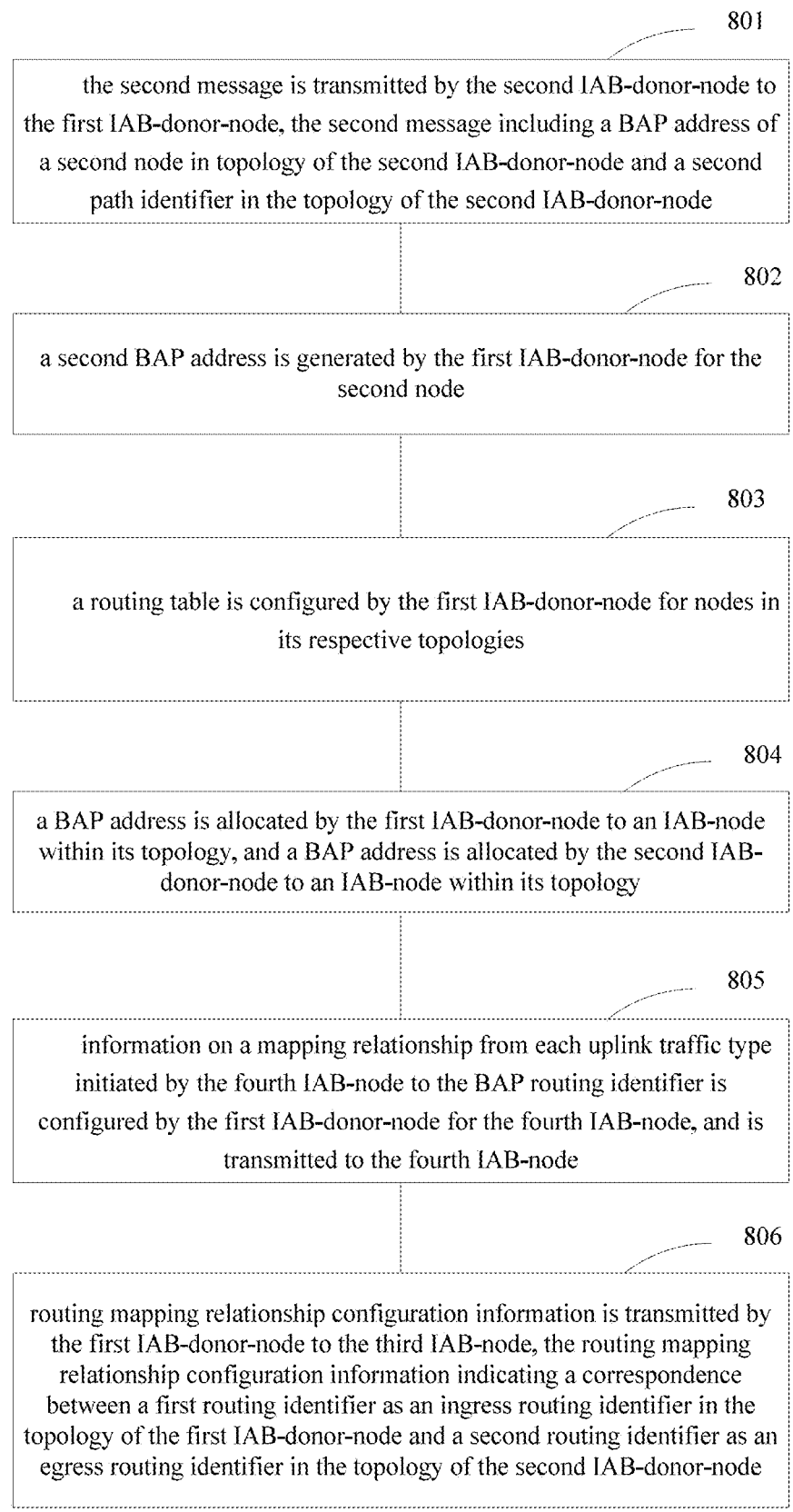
FIG. 8 is still another schematic diagram of the information transceiving method of the embodiment of this disclosure.

FIG. 8 is a schematic diagram of the information transceiving method. As shown in FIG. 8, the method includes:

801: the second message is transmitted by the second IAB-donor-node to the first IAB-donor-node, the second message including a BAP address of a second node in topology of the second IAB-donor-node and a second path identifier in the topology of the second IAB-donor-node;

802: a second BAP address is generated by the first IAB-donor-node for the second node; and

803: a routing table is configured by the first IAB-donor-node for nodes in its respective topologies.

In some embodiments, reference may be made to 601 for implementation of 801, with repeated parts being not going to be described herein any further.

In some embodiments, what is different from (I) is that the first IAB-donor-node does not need to transmit the first message to the first IAB-donor-node, and collision between the BAP addresses need not to be taken into account. That is, when the first IAB-donor-node allocates a BAP address to an IAB-node within its topology, it does not need to avoid the BAP address of the second node, but generates a virtual BAP address for the second node within the topology of the first IAB-donor-node (see 802). For example, donor CU1 generates a virtual BAP address (hereinafter referred to as a second virtual BAP address) for donor-DU2 within topology of its CU1. The second virtual BAP address is unique within the topology of CU1, but this address is not notified to the second IAB-donor-node, and is only used for routing within the topology managed by the first IAB-donor-node. The IAB-node within the topology of the second IAB-donor-node does not need to know the second virtual BAP address, and problem of collision between BAP addresses will not occur.

In some embodiments, the virtual BAP address may also be referred to as a dedicated BAP address. The virtual BAP address is unlike a common (real) BAP address, and the IAB-node itself does not need to know its own virtual BAP address (it does not require the IAB-donor-node to perform regular RRC configuration on it to obtain its own virtual BAP address).

In some embodiments, in 803, the first IAB-donor-node configures a routing table for nodes in its topology (such as the descendant IAB-node of the boundary IAB-node), the routing table being used for the IAB-nodes in the topology to determine a next hop of node of the packet. The routing table contains a next hop of node of data forwarding arriving at each IAB-node and the donor-DU, and the routing table includes a mapping relationship between the routing identifier and a BAP address of the next hop of node. What is different from (I) is that the routing identifier includes the second virtual BAP address and the first path identifier in the topology of the first IAB-donor-node. Reference may be made to Table 1 for a form of the routing table, with a difference that the BAP address of the second node is replaced with the second virtual BAP address.

In some embodiments, the method may further include:
  805: information on a mapping relationship from each uplink traffic type initiated by the fourth IAB-node to the BAP routing identifier is configured by the first IAB-donor-node for the fourth IAB-node, and is transmitted to the fourth IAB-node.

In some embodiments, when the first IAB-donor-node establishes an F1 tunnel for uplink transmission via a redundant path for the fourth IAB-node (such as IAB-node 4 shown in the figure), in order for the fourth IAB-node as an access IAB-node to select a BAP routing identifier corresponding to the redundant path, the BAP routing identifier in the mapping relationship includes the second virtual BAP address.

For example, when the traffic type is F1-U Tunnel, the corresponding routing identifier is included in UE Context Setup of F1AP signaling from a gNB CU to a gNB DU or a BH information IE in an UL UP TNL Information to be setup List information element (IE) in a of UE Context Modification procedure.

For example, when the traffic type is Non-UP Traffic, the corresponding routing identifier is included in F1 Setup Response of F1AP signaling from a gNB CU to a gNB DU, or in BH information IE in gNB-DU Configuration Update Acknowledge message or gNB-CU Configuration Update message.

In some embodiments, the method may further include:
  806: routing mapping relationship configuration information is transmitted by the first IAB-donor-node to the third IAB-node, the routing mapping relationship configuration information indicating a correspondence between a first routing identifier as an ingress routing identifier in the topology of the first IAB-donor-node and a second routing identifier as an egress routing identifier in the topology of the second IAB-donor-node.

In some embodiments, the third IAB-node is a boundary IAB-node (such as IAB-node 3 shown in the figure), which is dual-connected to the first IAB-donor-node and the second IAB-donor-node. After receiving the routing mapping relationship configuration information, the third IAB-node rewrites the BAP header by using the routing mapping relationship configuration information, implementation of the rewriting being going to be explained in the embodiments of the second aspect. The first routing identifier may be deemed as an ingress routing identifier on the boundary IAB-node, and the second routing identifier may be deemed as an egress routing identifier on the boundary IAB-node. The ingress and egress are referenced relative to a direction of data transmission, and data enter the boundary IAB-node from the ingress and flow out the boundary IAB-node from the egress. In other words, a routing identifier used before the data arriving at the boundary IAB-node is the first routing identifier, and a routing identifier used after the data is transmitted from the boundary IAB-node is the second routing identifier.

In some embodiments, the first routing identifier includes the second virtual BAP address and the first path identifier within the topology of the first IAB-donor-node. The second routing identifier includes the BAP address of the second node and the second path identifier, wherein reference may be made to (I) for meanings of the first path and the second path, with a difference from (I) being that what is included in the first path identifier is the second virtual BAP address, but not the BAP address of the second node.

Or, alternatively, the first routing identifier includes the second virtual BAP address and does not include the first path identifier, and the second routing identifier includes the BAP address of the second node and the second path identifier.

In some embodiments, the routing mapping relationship configuration information may include at least one entry of mapping relationship between an ingress routing identifier and an egress routing identifier, each entry of mapping relationship being able to be identified by an index.

In some embodiments, the routing mapping relationship configuration information is carried by F1AP signaling. For example, a new message may be established to carry the routing mapping relationship configuration information, or an existing message may be used to carry the routing mapping relationship configuration information. For example, a new information element BAP Routing ID Mapping in an existing message BAP Mapping Configuration is used to denote the routing mapping relationship configuration information, as shown in Table 2 above.

(III) For Downlink Redundant Path Transmission

Figure 9:
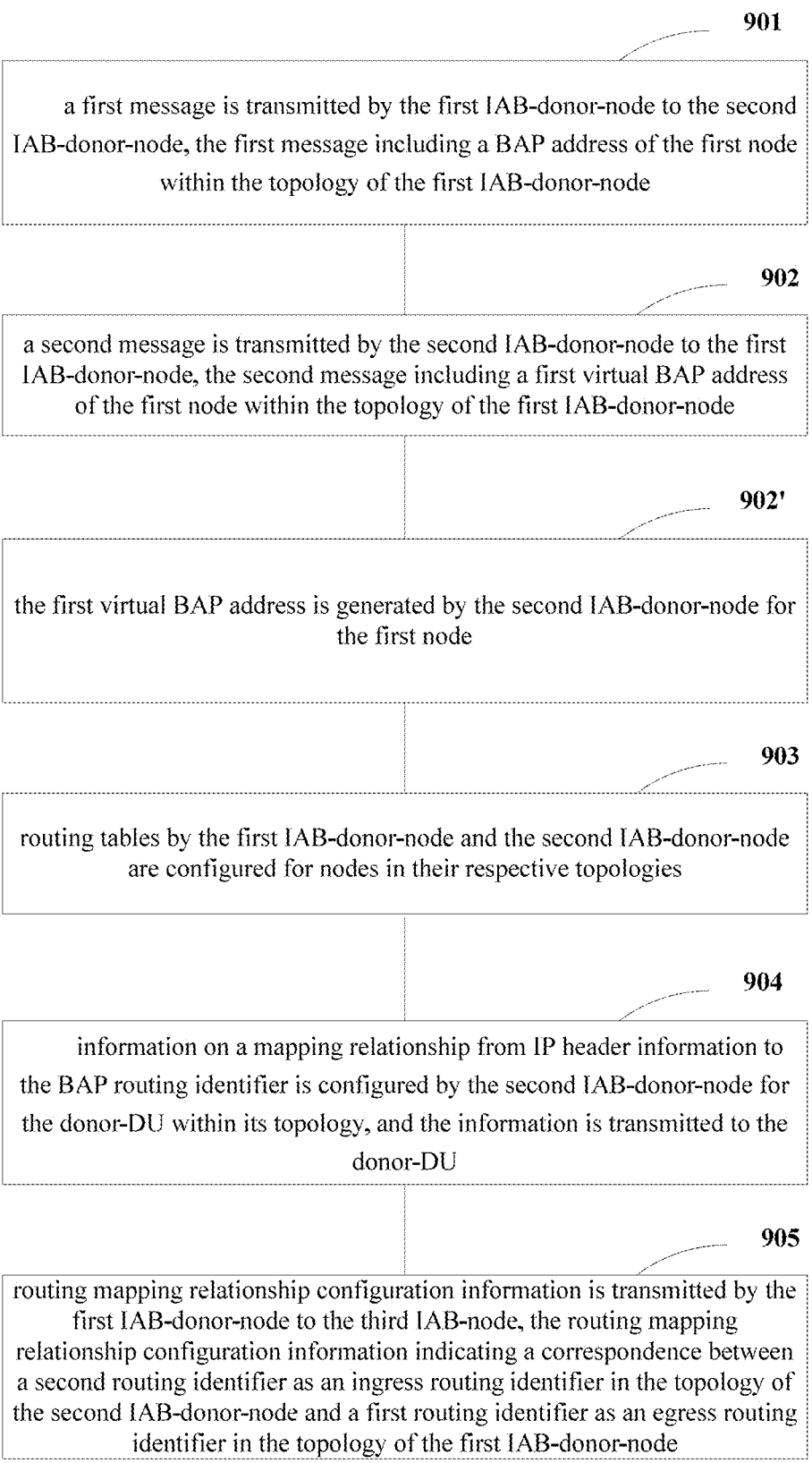
FIG. 9 is yet another schematic diagram of the information transceiving method of the embodiment of this disclosure.

FIG. 9 is a schematic diagram of the information transceiving method. As shown in FIG. 9, the method includes:
  901: a first message is transmitted by the first IAB-donor-node to the second IAB-donor-node, the first message including a BAP address of the first node within the topology of the first IAB-donor-node;
  902: a second message is transmitted by the second IAB-donor-node to the first IAB-donor-node, the second message including a first virtual BAP address of the first node within the topology of the first IAB-donor-node; and
  903: routing tables by the first IAB-donor-node and the second IAB-donor-node are configured for nodes in their respective topologies.

Figure 10:
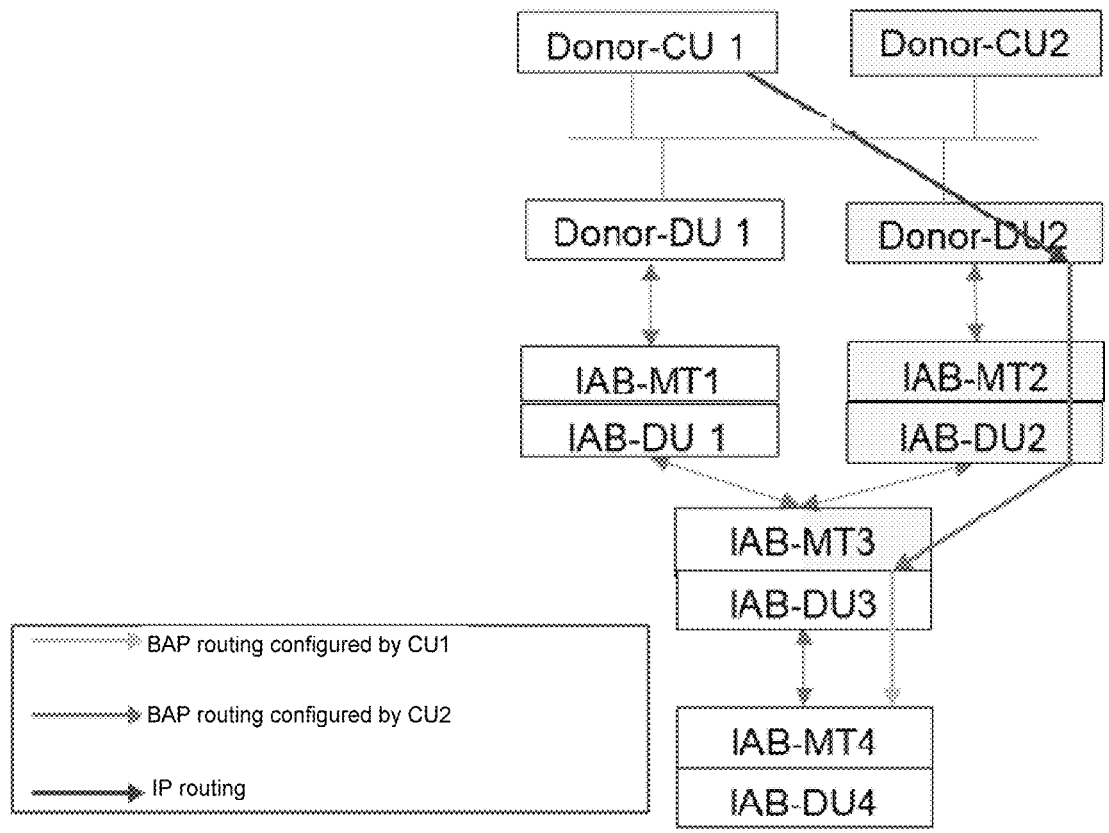
FIG. 10 is a schematic diagram of a downlink BAP routing of inter-donor topology redundancy of the embodiment of this disclosure.

In some embodiments, when downlink data are transmitted by using an inter-donor redundant path, the first node is a downlink destination node. FIG. 10 is a schematic diagram of a downlink BAP routing of inter-donor topology redundancy. As shown in FIG. 10, for example, when the first IAB-donor-node establishes downlink inter-donor topology redundancy for the fourth IAB-node (IAB-node 4), the first node is the IAB-node 4, a BAP address of the first node is a BAP address of IAB-node 4 within the topology of the first IAB-donor-node, 901 may be executed when inter-donor path redundancy needs to be established (i.e. traffic offloading is needed); however, the embodiments of this disclosure is not limited thereto. Following description shall be given by taking that the fourth IAB-node is the first node as an example; however, the first node may also be the third IAB-node (boundary IAB-node), or other IAB-nodes, and the embodiments of this disclosure is not limited thereto.

In some embodiments, the first message may further include IP header information, etc., which shall not be enumerated herein any further.

In some embodiments, after the second IAB-donor-node receives the first message, the method may further include:

902': the first virtual BAP address is generated by the second IAB-donor-node for the first node.

In some embodiments, the second IAB-donor-node (donor-CU2) generates a virtual BAP address (hereinafter referred to as a first virtual BAP address) for the first node (such as IAB-node 3 or 4) within its topology. The first virtual BAP address is unique within topology of CU2, and is used in performing routing within the topology managed by the second IAB-donor-node. In 902, the second IAB-donor-node transmits the second message including the generated first virtual BAP address to the first IAB-donor-node.

In some embodiments, optionally, the second message may further include a second path identifier within the topology of the second IAB-donor-node. The second path is a path within the topology of the second IAB-donor-node specified by the second IAB-donor-node, and as shown in FIG. 10, the second path refers to a path from donor-DU2 to the boundary IAB-node.

In some embodiments, in 903, the second IAB-donor-node configures a routing table for nodes within its topology (such as IAB-nodes between the boundary IAB-node and the donor-DU2, and the donor-DU2), the routing table being used for the nodes in the topology to determine a next hop of node of the packet. The routing table contains a next hop of node of data forwarding arriving at each IAB-node, and the routing table includes a mapping relationship between the routing identifier and a BAP address of the next hop of node. The routing identifier includes the first virtual BAP address and the second path identifier. The first IAB-donor-node configures a routing table for nodes within its topology, and reference may be made to existing techniques for details, which shall not be described herein any further.

In some embodiments, the method may further include:

904: information on a mapping relationship from IP header information to the BAP routing identifier is configured by the second IAB-donor-node for the donor-DU within its topology, and the information is transmitted to the donor-DU.

In some embodiments, when the second IAB-donor-node configures the donor-DU (such as donor-DU2 shown in the figure) with a mapping relationship between IP header information that traffic offloading is needed and routing identifiers, the routing identifiers in the mapping relationship includes the first virtual BAP address and the second path identifier.

For example, information on the mapping relationship may be carried by an IP-to-layer-2 traffic mapping Information List IE in a BAP Mapping Configuration procedure of F1AP signaling; however, the embodiments of this disclosure is not limited thereto. When donor-DU2 receives an IP packet of the first IAB-donor-node, it looks up a routing identifier corresponding to IP packet header information in the information on the mapping relationship, puts the routing identifier in the BAP header, adds it to the IP packet, generates a BAP protocol data unit, and transmits it. Reference may be made to existing techniques for implementation of a specific mode of transmission, which shall not be repeated herein any further.

In some embodiments, the method may further include:

905: routing mapping relationship configuration information is transmitted by the first IAB-donor-node to the third IAB-node, the routing mapping relationship configuration information indicating a correspondence between a second routing identifier as an ingress routing identifier in the topology of the second IAB-donor-node and a first routing identifier as an egress routing identifier in the topology of the first IAB-donor-node.

In some embodiments, the third IAB-node is a boundary IAB-node (such as IAB-node 3 shown in the figure), which is dual-connected to the first IAB-donor-node and the second IAB-donor-node. After receiving the routing mapping relationship configuration information, the third IAB-node rewrites the BAP header by using the routing mapping relationship configuration information, implementation of the rewriting being going to be explained in the embodiments of the second aspect. The second routing identifier may be deemed as an ingress routing identifier on the boundary IAB-node, and the first routing identifier may be deemed as an egress routing identifier on the boundary IAB-node. The ingress and egress are referenced relative to a direction of data transmission, and data enter the boundary IAB-node from the ingress and flow out the boundary IAB-node from the egress. In other words, a routing identifier used before the data arriving at the boundary IAB-node is the second routing identifier, and a routing identifier used after the data is transmitted from the boundary IAB-node is the first routing identifier.

In some embodiments, the first routing identifier includes the BAP address of the first node and the first path identifier within the topology of the first IAB-donor-node. The second routing identifier includes the first virtual BAP address and the second path identifier, wherein the second path is as described above, and the first path refers to a path from the boundary IAB-node to the fourth IAB-node (IAB-node 4), that is, a path in the topology of the first IAB-donor-node specified by the first IAB-donor-node.

Or, alternatively, the first routing identifier includes the BAP address of the first node and the first path identifier within the topology of the first IAB-donor-node, and the second routing identifier only includes the first virtual BAP, and does not need to include the second path identifier.

Or, alternatively, the first node is the third IAB-node (the boundary IAB-node), that is, when the first IAB-donor-node establishes downlink inter-donor topology redundancy for the third IAB-node, the first routing identifier includes the BAP address of the first node, and does not need to include the first path identifier; the second routing identifier includes the first virtual BAP address and the second path identifier, or the first routing identifier includes the BAP address of the first node and does not need to include the first path identifier; the second routing identifier only includes the first virtual BAP address and does not need to include the second path identifier. Therefore, the path identifiers may be ignored, and the mapping relationship of the routing identifiers may also be deemed as a mapping relationship between a virtual BAP address of the third IAB-node and a real BAP address.

In some embodiments, the routing mapping relationship configuration information may include at least one entry of mapping relationship between an ingress routing identifier and an egress routing identifier, each entry of mapping relationship being able to be identified by an index.

In some embodiments, the BAP address of the third IAB node (the boundary IAB node) may be allocated by the first IAB-donor-node via RRC signaling (such as an RRCReconfiguration message), or may also be allocated by the second IAB-donor-node via RRC signaling (such as an RRCReconfiguration message), and the embodiments of this disclosure is not limited thereto.

In some embodiments, the routing mapping relationship configuration information is carried by F1AP signaling. For example, a new message may be established to carry the routing mapping relationship configuration information, or an existing message may be used to carry the routing mapping relationship configuration information. For example, a new information element BAP Routing ID Mapping in an existing message BAP Mapping Configuration is used to denote the routing mapping relationship configuration information, which shall not be enumerated herein any further.

(IV) For Downlink Redundant Path Transmission

A difference from (III) is that there is no need to configure a virtual BAP address for the third IAB node (the boundary IAB node), instead, the first IAB-donor-node and the second IAB-donor-node (at least one second IAB-donor-node) allocate BAP addresses to the third IAB node (the boundary IAB node) respectively, that is, the third IAB node (the boundary IAB node) will store at least two BAP addresses, which are respectively allocated by different IAB-donor-nodes.

Wherein, the first BAP address of the third IAB node may be allocated by the first IAB-donor-node via RRC signaling (such as an RRCReconfiguration message), and the second BAP address of the third IAB node may be allocated by the second IAB-donor-node via RRC signaling (such as an RRCReconfiguration message), and the embodiments of this disclosure is not limited thereto.

In addition, the behavior of rewriting at the third IAB node side is also different from that in (III), and reference may be made to the explanations of the embodiments of the second aspect for details.

It should be noted that FIGS. 4-9 only schematically illustrate the embodiments of this disclosure; however, this disclosure is not limited thereto. For example, an order of execution of the steps may be appropriately adjusted, and furthermore, some other steps may be added, or some steps therein may be reduced. And appropriate variants may be made by those skilled in the art according to the above contents, without being limited to what is contained in FIGS. 4-9.

The above implementations only illustrate the embodiments of this disclosure. However, this disclosure is not limited thereto, and appropriate variants may be made on the basis of these implementations. For example, the above implementations may be executed separately, or one or more of them may be executed in a combined manner.

It can be seen from the above embodiments that related information on BAP addresses of nodes (real BAP addresses and/or virtual BAP addresses) and/or path identifiers within their respective topologies may be exchanged between donors, which may achieve cross-topology BAP routing management and configuration, and inter-donor topology redundancy BAP routing may be supported in the IAB network, thereby achieving inter-donor load balancing, alleviating traffic overload of a donor, and optimizing network performances. Cross-topology routing failures may be avoided, and BAP address spaces controlled by donor-nodes will not be restricted.

Embodiments of a Second Aspect

The embodiments of this disclosure provides a data transmission method, which shall be described from a side of a third IAB-node (a boundary IAB-node), with contents identical to those in the embodiments of the first aspect being not going to be described herein any further.

Figure 11:
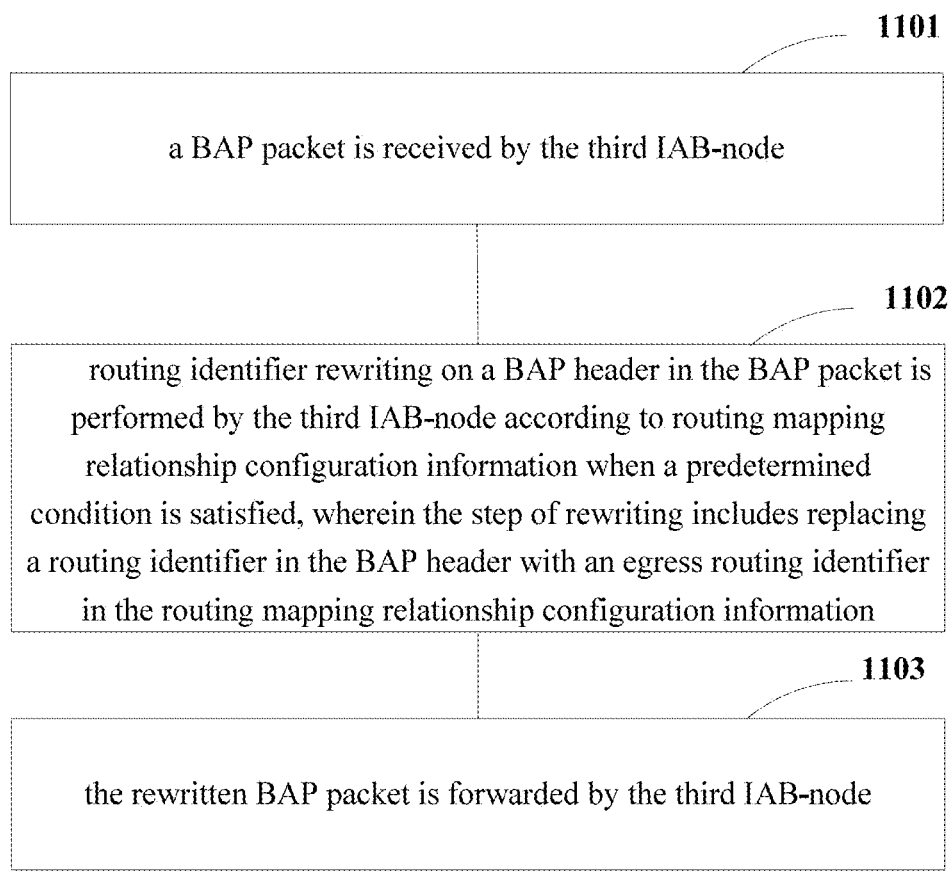
FIG. 11 is a schematic diagram of the data transmission method of an embodiment of this disclosure.

FIG. 11 is a schematic diagram of the data transmission method of this embodiment. As shown in FIG. 11, the method includes:

1101: a BAP packet is received by the third IAB-node;

1102: routing identifier rewriting on a BAP header in the BAP packet is performed by the third IAB-node according to routing mapping relationship configuration information when a predetermined condition is satisfied, wherein the step of rewriting includes replacing a routing identifier in the BAP header with an egress routing identifier in the routing mapping relationship configuration information; and

1103: the rewritten BAP packet is forwarded by the third IAB-node.

Therefore, the boundary IAB-node rewrites the BAP header of the BAP packet needing to be forwarded, and replaces the routing identifier in the BAP header, so as to achieve concatenating of BAP route in at least two topologies, thereby avoiding cross-topology routing failures. And inter-donor topology redundancy BAP routing may be supported in the IAB network, thereby achieving inter-donor load balancing, alleviating traffic overload of a donor, and optimizing network performances.

In some embodiments, the third IAB-node is a boundary IAB-node, and its meaning as described above, which shall not be repeated herein any further.

In some embodiments, in 1101, the third IAB-node receives BAP packets transmitted by other IAB-nodes, wherein a lower layer of the third IAB-node transmits BAP data PDUs (protocol data units) to a receiving portion of a BAP entity of the third IAB-node. The header of the BAP packet will include a routing identifier. The routing identifier is determined according to the mapping relationship in operation 605, or 805, or 904. And the routing identifier may be deemed as an ingress routing identifier.

In some embodiments, in 1102, when the predetermined condition is satisfied, routing identifier rewriting will be performed on the header of the BAP packet. Steps of the rewriting shall be described below.

Figure 12:
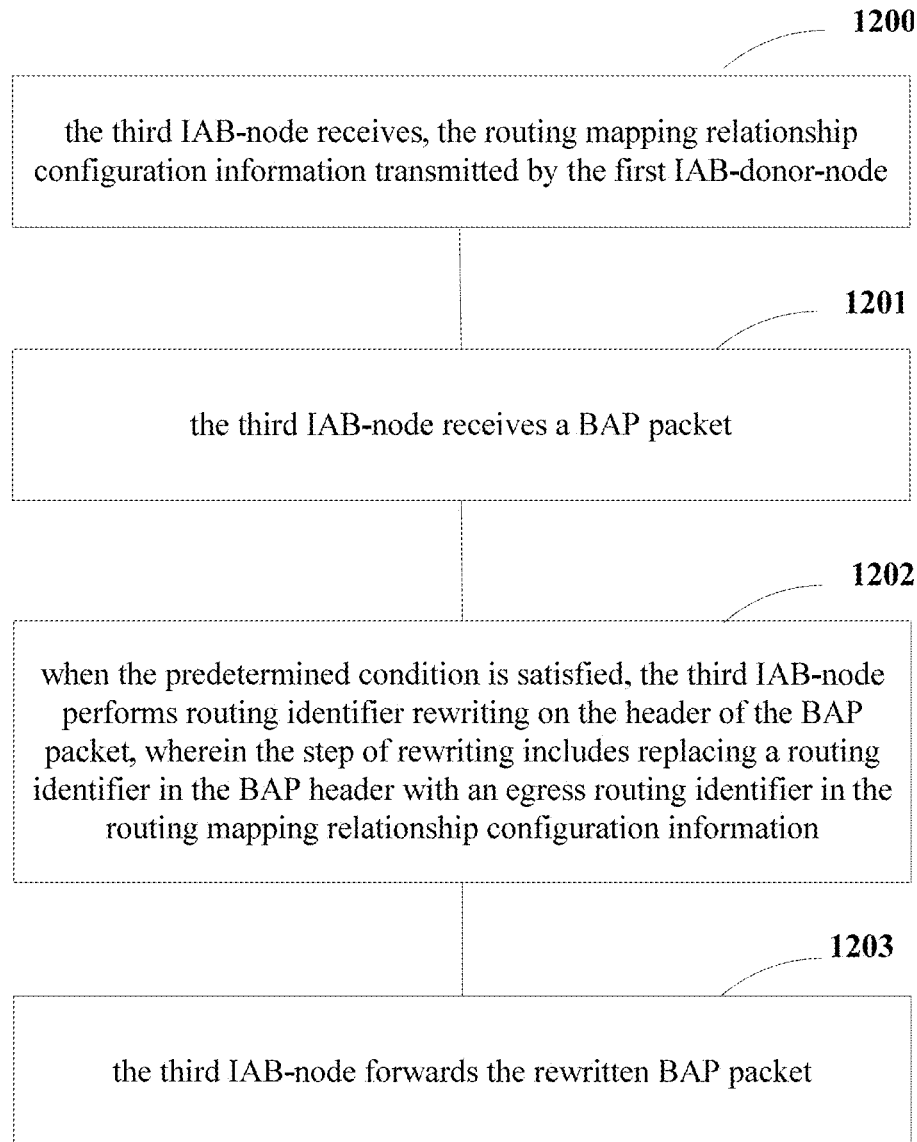
FIG. 12 is another schematic diagram of the data transmission method of the embodiment of this disclosure.

FIG. 12 is a schematic diagram of the data transmission method of this embodiment. As shown in FIG. 12, the method includes:

1200: the third IAB-node receives, the routing mapping relationship configuration information transmitted by the first IAB-donor-node;

1201: the third IAB-node receives a BAP packet;

1202: when the predetermined condition is satisfied, the third IAB-node performs routing identifier rewriting on the header of the BAP packet, wherein the step of rewriting includes replacing a routing identifier in the BAP header with an egress routing identifier in the routing mapping relationship configuration information; and

1203: the third IAB-node forwards the rewritten BAP packet.

In some embodiments, in 1200, the third IAB-node saves the received routing mapping relationship configuration information as a routing mapping relationship configuration information table, and the routing mapping relationship configuration information indicates a correspondence between the first routing identifier as the ingress routing identifier in the topology of the first IAB-donor-node and the second routing identifier as the egress routing identifier in the topology of the second IAB-donor-node. Reference may be made to (I)-(IV) in the embodiments of the first aspect for meanings of the first routing identifier and second routing identifier and a mode of carrying the routing mapping relationship configuration information, and reference may be made to 1101 for implementation of 1201, which shall not be repeated herein any further.

In some embodiments, in 1202, one implementation of the predetermined condition is that the destination address in the BAP packet is not the BAP address of the third IAB-node, and the routing identifier in the BAP header corresponds to the ingress routing identifier in the mapping relationship configuration information.

In some embodiments, the BAP address of the third IAB node (the boundary IAB node) may be allocated by the first IAB-donor-node via RRC signaling (such as an RRCReconfiguration message), or may also be allocated by the second IAB-donor-node via RRC signaling (such as an RRCReconfiguration message), and the embodiment of this disclosure is not limited thereto. The destination address in the BAP packet, namely the BAP address in the DESTINATION field of the BAP PDU, is not the BAP address of the third BAP node, that is, the third BAP node needs to forward the BAP packet.

In some embodiments, the routing identifier in the BAP header corresponds to the ingress routing identifier in the mapping relationship configuration information, indicating that the routing identifier in the BAP header matches the ingress routing identifier in the mapping relationship configuration information. After receiving the BAP packet, the third IAB-node may compare the routing identifier in the header of the BAP packet with ingress routing identifiers in entries in the routing mapping relationship configuration information. If the routing identifier in the header of the BAP packet is the same as an ingress routing identifier in one of the entries, it indicates that the routing identifier in the header of the BAP packet matches the ingress routing identifier in the mapping relationship configuration information, and a BAP address of an ingress identifier routing in an entry in the configuration information of this mapping relationship may be the BAP address of the second node, or the second virtual BAP address of the second node, or the first virtual BAP address of the first node, and reference may be made to the embodiments of the first aspect for details, which shall not be described herein any further.

In some embodiments, optionally, when a path identifier is not included in the first routing identifier, if the BAP address in the routing identifier in the header of the BAP packet is consistent with the BAP address in the ingress routing identifier in an entry therein, it indicates that the routing identifier in the header of the BAP matches the ingress routing identifier in the mapping relationship configuration information.

In some embodiments, when the predetermined condition is satisfied, the third IAB-node replaces the routing identifier in the BAP header in the BAP packet with the egress routing identifier corresponding to the ingress routing identifier in the mapping relationship configuration information, then transmits the rewritten BAP packet to a transmission portion of the BAP entity, and forwards the rewritten BAP packet. In 1203, if it is downlink, routing is performed by using existing techniques according to the routing table, which shall not be repeated herein any further. If it is uplink (that is, when the third IAB-node receives the BAP packet from the child node and rewrites the BAP header), that is, when the BAP packet is from the IAB child node, in 1203, an egress link corresponding to a parent node with a BAP address not appearing in a next hope of node contained in the routing table is selected for routing, or, in a case where a master base station is taken as a first IAB-donor-node of the third IAB-node, a parent node link corresponding to an SCG (secondary cell group) is selected for routing, and in a case where a secondary base station is taken as a first IAB-donor-node of the third IAB-node, a parent node link corresponding to an MCG (master cell group) is selected for routing. That is, one implementation is to select an egress link corresponding to the parent node with a BAP address not appearing in a column of "a next hop" of the routing table for routing. And another implementation is to select the parent node link corresponding to the SCG (secondary cell group) for routing when the master base station (MN, a master node, or an MgNB, master gNB) is taken as an F1-terminating node of the boundary IAB-node, and select the parent node link corresponding to the MCG (master cell group) for routing when the secondary base station (SN, a secondary node, or an SgNB, secondary gNB) is taken as an F1-terminating node of the boundary IAB-node.

In some embodiments, when the destination address in the BAP packet, that is, the BAP address in the DESTINATION field of the BAP PDU, is the BAP address of the third BAP node, the third IAB-node removes the BAP header of the BAP PDU, and transmits a BAP service data unit (SDU) to an upper layer. Reference may be made to existing techniques for details, which shall not be repeated herein any further.

In some embodiments, the first IAB-donor-node may further establish downlink inter-donor redundant topology for the third IAB-node (the first node is the third IAB-node), hence, the third IAB-node (the boundary IAB-node) needs to determine whether a BAP sublayer destination of the received BAP packet is itself. Therefore, in 1202, another implementation of the predetermined condition may also be that the destination address in the BAP packet is not the BAP address of the third IAB-node and the virtual BAP address corresponding to the BAP address of the third IAB-node in the routing mapping relationship configuration information, and the routing identifier in the BAP header corresponds to the ingress routing identifier in the mapping relationship configuration information. Wherein, in the mapping relationship configuration, the second routing identifier is taken as the ingress routing identifier, and the first routing identifier is taken as the egress routing identifier. Reference may be made to (III) in the embodiments of the first aspect for meanings of the first routing identifier and the second routing identifier, which shall not be repeated herein any further.

In some embodiments, the BAP address of the third IAB-node (the boundary IAB-node) may be allocated by the first IAB-donor-node via RRC signaling (such as an RRCReconfiguration message), or may be allocated by the second IAB-donor-node via RRC signaling (such as an RRCReconfiguration message).

In some embodiments, when the first IAB-donor-node establishes downlink inter-donor redundant topology for the third IAB-node (the first node is the third IAB-node), in the mapping relationship configuration information, both the first routing identifier as the egress routing identifier and the second path identifier as the ingress routing identifier may not include a path identifier (i.e. all path identifiers are empty), that is, the ingress routing identifier only includes the virtual BAP address of the third IAB-node, while the egress routing identifier only includes the BAP address of the third IAB-node. The mapping relationship of the routing identifiers (the mapping relationship configuration information) may also be deemed as a mapping relationship between the virtual BAP address and a real BAP address of the third IAB-node; in other words, in the mapping relationship configuration information, when both the first routing identifier as the egress routing identifier and the second path identifier as the ingress routing identifier do not include a path identifier, it indicates that the entry corresponds to a situation where the third IAB-node is taken as the BAP sublayer destination.

In some embodiments, when the destination address in the BAP packet (the BAP address in the DESTINATION field of the BAP PDU) is the BAP address of the third IAB-node or the virtual BAP address corresponding to the BAP address of the third IAB-node in the route mapping relationship configuration information, the third IAB-node removes the BAP header of the BAP packet (BAP PDU), and transmits a BAP service data unit (SDU) to an upper layer. Reference may be made to existing techniques for details, which shall not be repeated herein any further.

In some embodiments, in order to reduce a processing time of the boundary IAB-node, whether rewriting is needed is determined only in some cases. For example, if the boundary IAB-node is not configured with the routing mapping relationship configuration information (i.e. 1200 is not included), or if the BAP packet comes from a parent node link to the F1-terminating node, whether rewriting is needed is not needed to be determined, i.e. rewriting is not needed to be performed, and routing is directly performed in an existing method.

That is, in 1202, another implementation of the predetermined condition is that the BAP SDU to which the BAP packet corresponds comes from an IAB child node link or from a parent node link leading to the second IAB-donor-node, the destination address in the BAP packet (BAP data PDU) is not the BAP address of the third IAB-node and the virtual BAP address corresponding to the BAP address of the third IAB-node in the routing mapping relationship configuration information, and the routing identifier in the BAP header corresponds to the ingress routing identifier in the mapping relationship configuration information. A specific method for determining whether they correspond is as described above, which shall not be repeated herein any further. The BAP address of the third IAB-node (the boundary IAB-node) may be allocated by the first IAB-donor-node via RRC signaling (such as an RRCReconfiguration message), or by the second IAB-donor-node via RRC signaling (such as an RRCReconfiguration message). When the predetermined condition is satisfied, the third IAB-node replaces the routing identifier in the BAP header in the BAP packet with the egress routing identifier corresponding to the ingress routing identifier in the mapping relationship configuration information. Then, the rewritten BAP packet is transmitted to the transmission portion of the BAP entity to forward the rewritten BAP packet. Implementations of the uplink forwarding and downlink forwarding are as described above, which shall not be repeated herein any further.

In some embodiments, it is not needed to configure a virtual BAP address for the third IAB-node (the boundary IAB-node), instead, the first IAB-donor-node and the second IAB-donor-node (at least one second IAB-donor-node) respectively allocate BAP addresses for the third IAB-node (the boundary IAB-node), that is, the third IAB-node (the boundary IAB-node) will store at least two BAP addresses, which are respectively allocated by different IAB-donor-nodes.

In some embodiments, in 1202, a further implementation of the predetermined condition is that the destination address in the BAP packet is not the BAP address of the third node, the routing identifier in the BAP header corresponds to the ingress routing identifier in the mapping relationship configuration information, and the BAP address of the third node may be a first BAP address allocated by the first IAB-donor-node for the third IAB-node and/or a second BAP address allocated by the second IAB-donor-node for the third IAB-node. A specific method for determining whether they correspond is as described above, which shall not be repeated herein any further. When the predetermined condition is satisfied, the third IAB-node replaces the routing identifier in the BAP header in the BAP packet with the egress routing identifier corresponding to the ingress routing identifier in the mapping relationship configuration information. Then, the rewritten BAP packet is transmitted to the transmission portion of the BAP entity to forward the rewritten BAP packet. Implementations of the uplink forwarding and downlink forwarding are as described above, which shall not be repeated herein any further.

In some embodiments, when the predetermined conditions are not satisfied, that is, when the destination address in the BAP packet is the first BAP address or the second BAP address, the third IAB-node removes the BAP header of the BAP PDU and transmits the BAP service data unit (SDU) to an upper layer. Reference may be made to existing techniques for details, which shall not be repeated herein any further.

It can be seen from the above embodiments that for uplink redundant path transmission, due to the replacement of the routing identifier in the packet with the egress routing identifier in the mapping relationship configuration information, and as described above, the egress routing identifier is the second routing identifier within the topology of the second IAB-donor-node. Therefore, after the uplink packet passes through the boundary IAB-node, it may be forwarded by using the inter-donor redundant topology; and for downlink redundant path transmission, due to the replacement of the routing identifier in the packet with the egress routing identifier in the mapping relationship configuration information, and as described above, the egress routing identifier is the first routing identifier within the topology of the first IAB-donor-node. Therefore, the downlink packet may be forwarded by using the inter-donor redundant topology before passing through the boundary IAB-node, thereby achieving inter-donor load balancing, alleviating traffic overload of a donor, and optimizing network performances.

It should be noted that FIGS. 11-12 only schematically illustrate the embodiments of this disclosure; however, this disclosure is not limited thereto. For example, an order of execution of the steps may be appropriately adjusted, and furthermore, some other steps may be added, or some steps therein may be reduced. And appropriate variants may be made by those skilled in the art according to the above contents, without being limited to what is contained in FIGS. 11-12.

The above implementations only illustrate the embodiments of this disclosure. However, this disclosure is not limited thereto, and appropriate variants may be made on the basis of these implementations. For example, the above implementations may be executed separately, or one or more of them may be executed in a combined manner.

It can be seen from the above embodiments that the boundary IAB-node rewrites the BAP header of BAP packet needing to be forwarded to replace the routing identifier in the BAP header, so as to achieve concatenating of BAP route in at least two topologies. Thus, routing failures of cross-topology may be avoided, inter-donor topology redundancy BAP routing may be supported in the IAB network, thereby achieving inter-donor load balancing, alleviating traffic overload of a donor, and optimizing network performances.

Embodiments of a Third Aspect

The embodiments of this disclosure provides an information transceiving method, which shall be described from a side of a third IAB-node, with contents identical to those in the embodiments of the second aspect being not going to be described herein any further.

FIG. 13 is a schematic diagram of the information transceiving method. As shown in FIG. 13, the method includes:
  1301: the third IAB-node receives, routing mapping relationship configuration information transmitted by a first IAB-donor-node,
    the routing mapping relationship configuration information indicating a correspondence between a first routing identifier as an ingress routing identifier within a topology domain of the first IAB-donor-node and a second routing identifier as an egress routing identifier in a topology domain of a second IAB-donor-node, wherein reference may be made to (I) or (II) in the embodiments of the first aspect for meanings of the first routing identifier and the second routing identifier, which shall not be repeated herein any further; or,
    the routing mapping relationship configuration information indicating a correspondence between a second routing identifier as an ingress routing identifier within a topology domain of a second IAB-donor-node and a first routing identifier as an egress routing identifier in a topology domain of the first IAB-donor-node, wherein reference may be made to (III) in the embodiments of the first aspect for meanings of the first routing identifier and the second routing identifier, which shall not be repeated herein any further.

In some embodiments, the routing mapping relationship configuration information may be carried by F1AP signaling, and reference may be made to the embodiments of the first aspect for details, which shall not be repeated herein any further.

The above implementations only illustrate the embodiments of this disclosure. However, this disclosure is not limited thereto, and appropriate variants may be made on the basis of these implementations. For example, the above implementations may be executed separately, or one or more of them may be executed in a combined manner.

Embodiments of a Fourth Aspect

The embodiments of this disclosure provides an information transceiving method, which shall be described from a side of a fourth IAB-node, the fourth IAB-node being a descendant node of a boundary IAB-node. FIG. 14 is a schematic diagram of the information transceiving method. As shown in FIG. 14, the method includes:
  1401: the fourth IAB node receives, routing table information transmitted by a first IAB-donor-node, the routing table information including a routing identifier, the routing identifier including a BAP address of a second node in topology of a second IAB-donor-node and a first path identifier in topology of the first IAB-donor-node, or, the routing identifier including the above-described second virtual BAP address and the first path identifier.

In some embodiments, reference may be made to (I) or (II) in the embodiments of the first aspect for implementation of the routing table information, which shall not be described herein any further.

The above implementations only illustrate the embodiments of this disclosure. However, this disclosure is not limited thereto, and appropriate variants may be made on the basis of these implementations. For example, the above implementations may be executed separately, or one or more of them may be executed in a combined manner.

Embodiments of a Fifth Aspect

Figure 15:
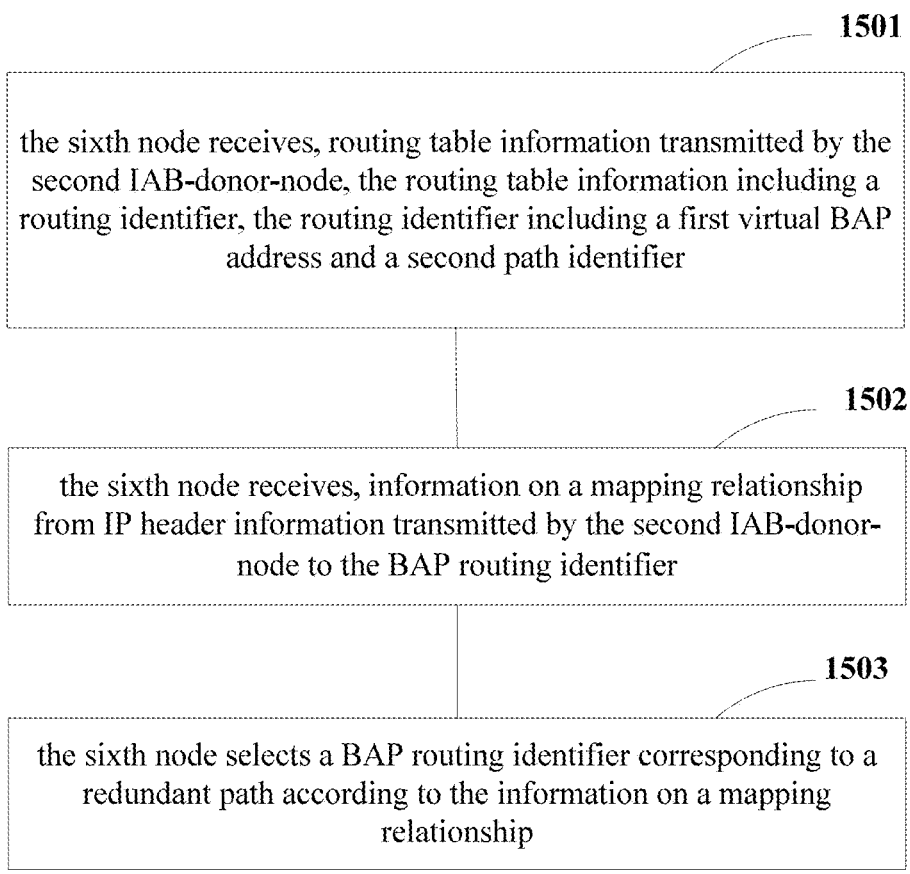
FIG. 15 is yet still another further schematic diagram of the information transceiving method of the embodiment of this disclosure.

The embodiments of this disclosure provides an information transceiving method, which shall be described from a side of a sixth node, the sixth node being a second node (donor-DU2), or an IAB-node between donor-DU2 and a boundary node. FIG. 15 is a schematic diagram of the information transceiving method. As shown in FIG. 15, the method includes:
  1501: the sixth node receives, routing table information transmitted by the second IAB-donor-node, the routing table information including a routing identifier, the routing identifier including a first virtual BAP address and a second path identifier. Reference may be made to (III) in the embodiments of the first aspect for implementation of the routing table information, which shall not be described herein any further.

Optionally, when the sixth node is donor-DU2, the method may further include:
  1502: the sixth node receives, information on a mapping relationship from IP header information transmitted by the second IAB-donor-node to the BAP routing identifier. Reference may be made to 904 in (III) in the embodiments of the first aspect for implementation of the information, which shall not be described herein any further.

In some embodiments, the method may further include:
  1503: the sixth node selects a BAP routing identifier corresponding to a redundant path according to the information on a mapping relationship, then putting the BAP routing identifier in a BAP header and adding to a BAP SDU (IP packet) to establish a BAP data PDU, and performing a transmission operation according to an existing technique.

The above implementations only illustrate the embodiments of this disclosure. However, this disclosure is not limited thereto, and appropriate variants may be made on the basis of these implementations. For example, the above implementations may be executed separately, or one or more of them may be executed in a combined manner.

Embodiments of a Sixth Aspect

The embodiments of this disclosure provides an information transceiving apparatus, applicable to a first IAB-donornode, such as an IAB-donor-node, or one or some components of assemblies configured in the IAB-donor-node, with contents identical to those in the embodiments of the first aspect being not going to be described herein any further.

Figure 16:
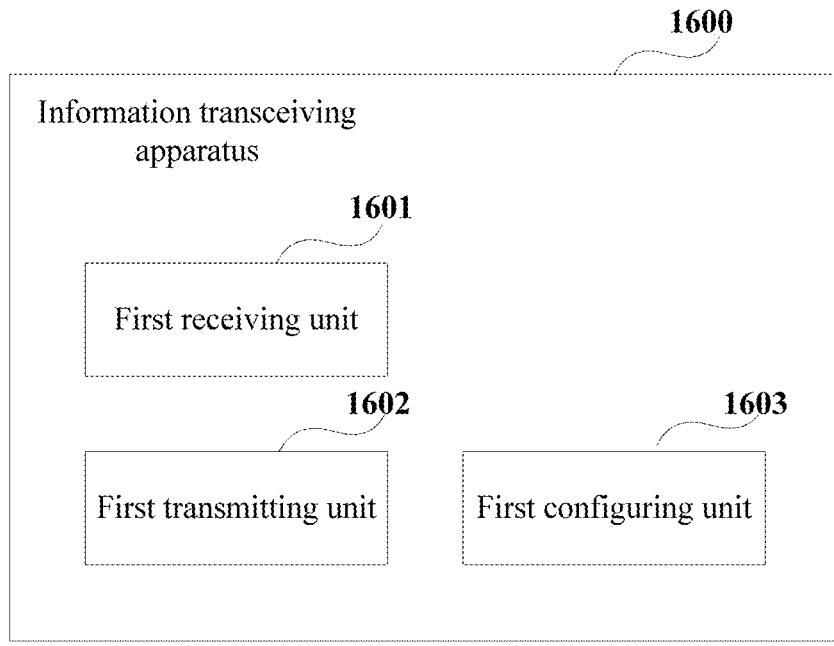
FIG. 16 is a schematic diagram of the information transceiving apparatus of an embodiment of this disclosure.

FIG. 16 is a schematic diagram of the information transceiving apparatus of the embodiment of this disclosure. As shown in FIG. 16, the information transceiving apparatus 1600 includes:

- a first receiving unit 1601 configured to receive a second message transmitted by a second IAB-donor-node, the second message including a BAP address of a second node in topology of the second IAB-donor-node and/or a second path identifier in topology of the second IAB-donor-node and/or a first virtual BAP address of a first node in topology of the first IAB-donor-node; and/or,
- a first transmitting unit 1602 configured to transmit a first message to the second IAB-donor-node, the first message including a BAP address of a first node in topology of the first IAB-donor-node;
- a first configuring unit 1603 configured to configure a routing table for nodes in its topology.

In some embodiments, the apparatus further includes:
a first generating unit (not shown) configured to generate a second virtual BAP address for the second node.

In some embodiments, the apparatus further includes:
- a second transmitting unit (not shown) configured to transmit routing mapping relationship configuration information to a third IAB-node, the routing mapping relationship configuration information indicating a correspondence between a first routing identifier taken as an ingress routing identifier in the topology of the first IAB-donor-node and a second routing identifier taken as an egress routing identifier in the topology of the second IAB-donor-node.

In some embodiments, the apparatus further includes:
- a third transmitting unit (not shown) configured to transmit routing mapping relationship configuration information to a third IAB-node, the routing mapping relationship configuration information indicating a correspondence between a second routing identifier taken as an ingress routing identifier in the topology of the second IAB-donor-node and a first routing identifier taken as an egress routing identifier in the topology of the first IAB-donor-node.

In some embodiments, reference may be made to the embodiments of the first aspect of implementation of the routing table and the routing mapping relationship configuration information, which shall not be described herein any further.

The embodiments of this disclosure provides an information transceiving apparatus, applicable to a second IAB-donor-node, such as an IAB-donor-node, or one or some components of assemblies configured in the IAB-donor-node, with contents identical to those in the embodiments of the first aspect being not going to be described herein any further.

Figure 17:
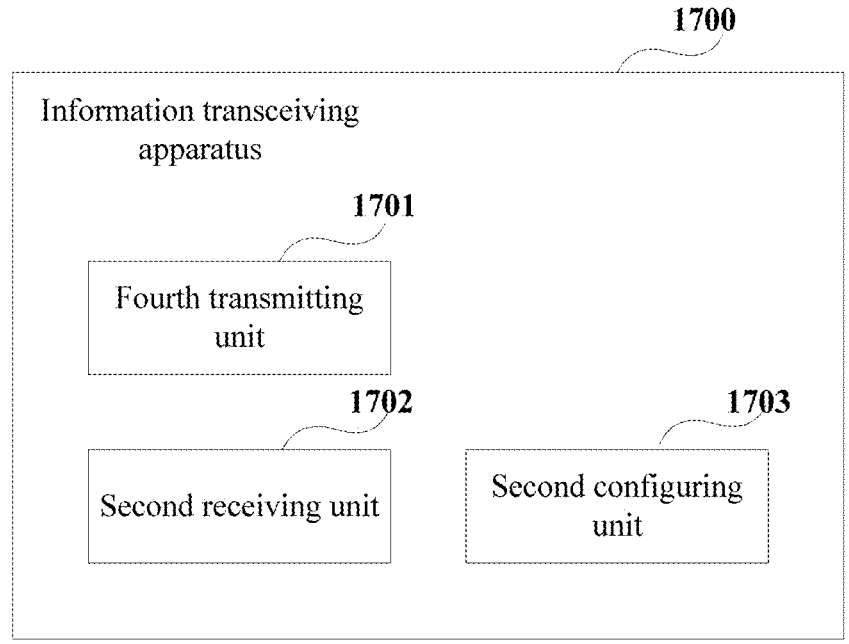
FIG. 17 is another schematic diagram of the information transceiving apparatus of the embodiment of this disclosure.

FIG. 17 is a schematic diagram of the information transceiving apparatus of the embodiment of this disclosure. As shown in FIG. 17, the information transceiving apparatus 1700 includes:

- a fourth transmitting unit 1701 configured to transmit a second message to a first IAB-donor-node, the second message including a BAP address of a second node in topology of the second IAB-donor-node and/or a second path identifier in topology of the second IAB-donor-node and/or a first virtual BAP address of a first node in topology of the first IAB-donor-node; and/or,
- a second receiving unit 1702 configured to receive a first message transmitted by the first IAB-donor-node, the first message including a BAP address of the first node in topology of the first IAB-donor-node;
- a second configuring unit 1703 configured to configure a routing table for nodes in its topology.

In some embodiments, the apparatus further includes:
a second generating unit (not shown) configured to generate a first virtual BAP address for the first node.

In some embodiments, reference may be made to the embodiments of the first aspect for implementation of the routing table, which shall not be described herein any further.

The above implementations only illustrate the embodiments of this disclosure. However, this disclosure is not limited thereto, and appropriate variants may be made on the basis of these implementations. For example, the above implementations may be executed separately, or one or more of them may be executed in a combined manner.

It should be noted that the components or modules related to this disclosure are only described above. However, this disclosure is not limited thereto, and the information transceiving apparatus 1600-1700 may further include other components or modules, and reference may be made to related techniques for particulars of these components or modules.

Furthermore, for the sake of simplicity, connection relationships between the components or modules or signal profiles are only illustrated in FIGS. 16-17. However, it should be understood by those skilled in the art that such related techniques as bus connection, etc., may be adopted. And the above components or modules may be implemented by hardware, such as a processor, a memory, a transmitter, and a receiver, etc., which are not limited in the embodiment of this disclosure.

It can be seen from the above embodiments that related information on BAP addresses of nodes (real BAP addresses and/or virtual BAP addresses) and/or path identifiers within their respective topologies may be exchanged between donors, which may achieve cross-topology BAP routing management and configuration, and inter-donor topology redundancy BAP routing may be supported in the IAB network, thereby achieving inter-donor load balancing, alleviating traffic overload of a donor, and optimizing network performances. Cross-topology routing failures may be avoided, and BAP address spaces controlled by donor-nodes will not be restricted.

Embodiments of a Seven Aspect

The embodiments of this disclosure provides a data transmission apparatus. The apparatus may be, for example, a third IAB-node, or one or some components or assemblies configured in the third IAB-node, with contents identical to those in the embodiment of the second aspect being not going to be described herein any further.

Figure 18:
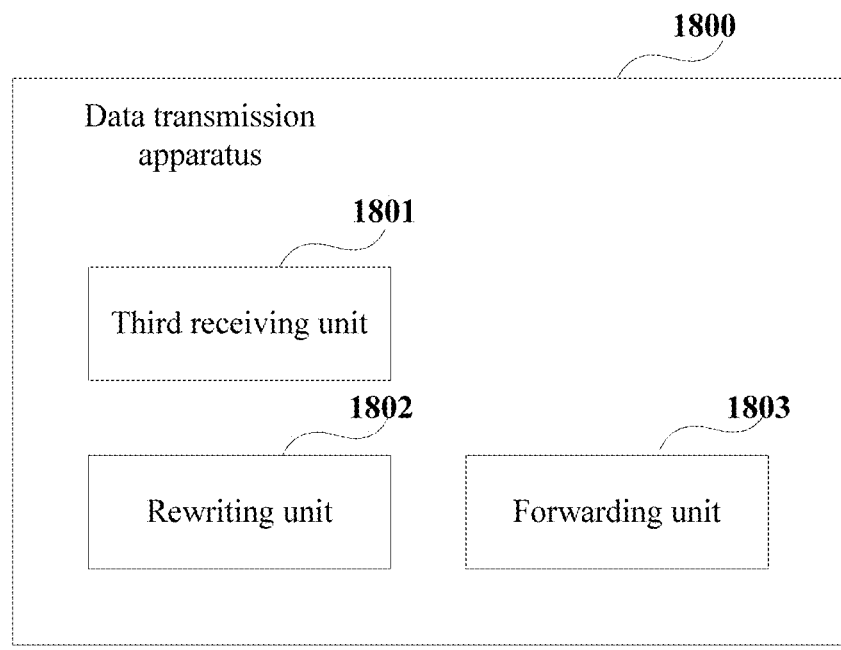
FIG. 18 is a schematic diagram of the data transmission apparatus of an embodiment of this disclosure.

FIG. 18 is a schematic diagram of the data transmission apparatus of the embodiment of this disclosure. As shown in FIG. 18, the data transmission apparatus includes:

- a third receiving unit 1801 configured to receive a BAP packet;
- a rewriting unit 1802 configured to perform routing identifier rewriting on a BAP header in the BAP packet according to routing mapping relationship configuration information when a predetermined condition is satisfied, wherein the rewriting unit 1802 replaces a routing identifier in the BAP header with an egress routing identifier in the routing mapping relationship configuration information;

a forwarding unit 1803 configured to forward the rewritten BAP packet.

In some embodiments, the predetermined condition is that a destination address in the BAP packet is not a BAP address of the third IAB-node, and the routing identifier in the BAP header corresponds to the ingress routing identifier in the routing mapping relationship configuration information.

In some embodiments, the predetermined condition is that a destination address in the BAP packet is neither a BAP address of the third IAB-node nor a virtual BAP address corresponding to a BAP address of the third IAB-node in the routing mapping relationship configuration information, and the routing identifier in the BAP header corresponds to the ingress routing identifier in the mapping relationship configuration information.

In some embodiments, the predetermined condition is that the BAP packet is from an IAB child node link or from a link of parent node leading to the second IAB-donor-node, a destination address in the BAP packet is neither a BAP address of the third IAB-node nor a virtual BAP address corresponding to a BAP address of the third IAB-node in the routing mapping relationship configuration information, and the routing identifier in the BAP header corresponds to the ingress routing identifier in the mapping relationship configuration information.

In some embodiments, when the destination address in the BAP packet is the BAP address of the third IAB-node or the virtual BAP address corresponding to the third IAB-node in the routing mapping relationship configuration information, the third IAB-node transmits a BAP SDU with a BAP header being deleted to an upper layer.

In some embodiments, the apparatus may further include:

a fourth receiving unit (not shown) configured to receive routing mapping relationship configuration information transmitted by the first IAB-donor-node, the routing mapping relationship configuration information indicating a correspondence between a first routing identifier as an ingress routing identifier in the topology of the first IAB-donor-node and a second routing identifier as an egress routing identifier in the topology of the second IAB-donor-node, or, the routing mapping relationship configuration information indicating a correspondence between a second routing identifier as an ingress routing identifier in the topology of the second IAB-donor-node and a first routing identifier as an egress routing identifier in the topology of the first IAB-donor-node. Reference may be made to the embodiments of the second aspect for implementation of the routing mapping relationship configuration information, which shall not be described herein any further.

In some embodiments, when the BAP packet is a packet from an IAB child node, the forwarding unit 1803 selects an egress link for routing, the egress link corresponding to a parent node with a BAP address not appearing in a next hop of node contained in a routing table, or, in a case where a master base station is taken as a first IAB-donor-node of the third IAB-node, the forwarding unit selects a parent node link for routing, the parent node link corresponding to a secondary cell group (SCG), and in a case where a secondary base station is taken as the first IAB-donor-node of the third IAB-node, the forwarding unit selects a parent node link for routing, the parent node link corresponding to a master cell group (MCG).

The above implementations only illustrate the embodiments of this disclosure. However, this disclosure is not limited thereto, and appropriate variants may be made on the basis of these implementations. For example, the above implementations may be executed separately, or one or more of them may be executed in a combined manner.

It should be noted that the components or modules related to this disclosure are only described above. However, this disclosure is not limited thereto, and the data transmission apparatus 1800 may further include other components or modules, and reference may be made to related techniques for particulars of these components or modules.

Furthermore, for the sake of simplicity, connection relationships between the components or modules or signal profiles are only illustrated in FIG. 18. However, it should be understood by those skilled in the art that such related techniques as bus connection, etc., may be adopted. And the above components or modules may be implemented by hardware, such as a processor, a memory, a transmitter, and a receiver, etc., which are not limited in the embodiment of this disclosure.

It can be seen from the above embodiments that the boundary IAB-node rewrites the BAP header of BAP packet needing to be forwarded to replace the routing identifier in the BAP header, so as to achieve concatenating of BAP route in at least two topologies. Thus, routing failures of cross-topology may be avoided, inter-donor topology redundancy BAP routing may be supported in the IAB network, thereby achieving inter-donor load balancing, alleviating traffic overload of a donor, and optimizing network performances.

Embodiments of an Eighth Aspect

The embodiments of this disclosure provides an information transceiving apparatus. The apparatus may be, for example, a third IAB-node, or one or some components or assemblies configured in the third IAB-node, with contents identical to those in the embodiments of the third aspect being not going to be described herein any further.

Figure 19:
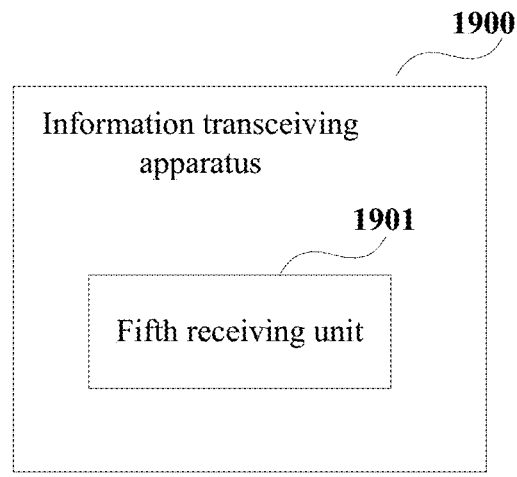
FIG. 19 is a further schematic diagram of the information transceiving apparatus of the embodiment of this disclosure.

FIG. 19 is a schematic diagram of the information transceiving apparatus. As shown in FIG. 19, the apparatus includes:

a fifth receiving unit 1901 configured to receive routing mapping relationship configuration information transmitted by a first IAB-donor-node, the routing mapping relationship configuration information indicating a correspondence between a first routing identifier as an ingress routing identifier within a topology domain of the first IAB-donor-node and a second routing identifier as an egress routing identifier in a topology domain of a second IAB-donor-node, wherein reference may be made to (I) or (II) in the embodiments of the first aspect for meanings of the first routing identifier and the second routing identifier, which shall not be repeated herein any further; or, the routing mapping relationship configuration information indicating a correspondence between a second routing identifier as an ingress routing identifier within a topology domain of a second IAB-donor-node and a first routing identifier as an egress routing identifier in a topology domain of the first IAB-donor-node, wherein reference may be made to (III) in the embodiments of the first aspect for meanings of the first routing identifier and the second routing identifier, which shall not be repeated herein any further.

The embodiment of this disclosure provides an information transceiving apparatus. The apparatus may be, for example, a fourth IAB-node, or one or some components or assemblies configured in the fourth IAB-node, with contents identical to those in the embodiments of the fourth aspect being not going to be described herein any further.

Figure 20:
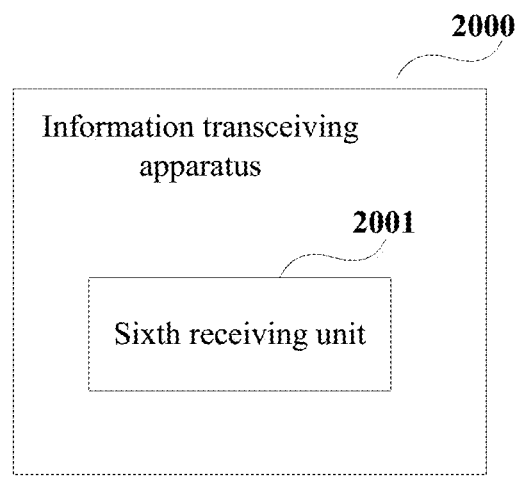
FIG. 20 is still another schematic diagram of the information transceiving apparatus of the embodiment of this disclosure.

FIG. 20 is a schematic diagram of the information transceiving apparatus. As shown in FIG. the apparatus includes:

- a sixth receiving unit 2001 configured to receive routing table information transmitted by a first IAB-donor-node, the routing table information including a routing identifier, the routing identifier including a BAP address of a second node in topology of a second IAB-donor-node and a first path identifier in topology of the first IAB-donor-node, or, the routing identifier including the above-described second virtual BAP address and the first path identifier.

In some embodiments, reference may be made to (I) or (II) in the embodiments of the first aspect for implementation of the routing table information, which shall not be described herein any further.

The embodiment of this disclosure provides an information transceiving apparatus. The apparatus may be, for example, a sixth IAB-node, or one or some components or assemblies configured in the sixth IAB-node, with contents identical to those in the embodiment of the fifth aspect being not going to be described herein any further.

Figure 21:
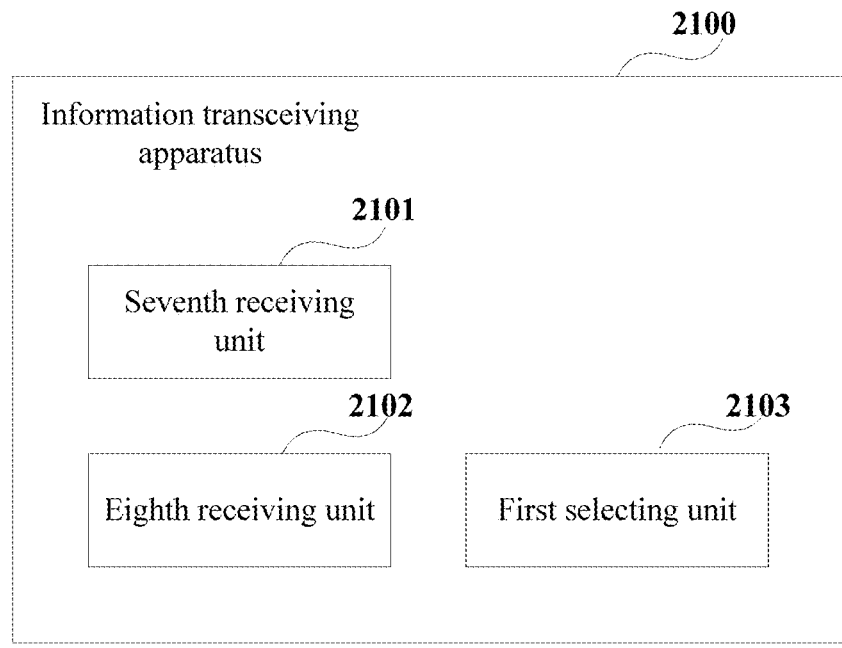
FIG. 21 is yet another schematic diagram of the information transceiving apparatus of the embodiment of this disclosure.

FIG. 21 is a schematic diagram of the information transceiving apparatus. As shown in FIG. 21, the apparatus includes:

- a seventh receiving unit 2101 configured to receive routing table information transmitted by a second IAB-donor-node, the routing table information including a routing identifier, the routing identifier including a first virtual BAP address and a second path identifier. Reference may be made to (III) in the embodiments of the first aspect for implementation of the routing table information, which shall not be described herein any further.

Optionally, when the sixth node is donor-DU2, the apparatus may further include:

- an eighth receiving unit 2102 configured to receive information on a mapping relationship from IP header information to the BAP routing identifier transmitted by the second IAB-donor-node. Reference may be made to 904 in (III) in the embodiments of the first aspect for implementation of the information, which shall not be described herein any further.

In some embodiments, the apparatus may further include:

- a first selecting unit 2103 configured to select a BAP routing identifier corresponding to a redundant path by the sixth node according to the information on a mapping relationship, then putting the BAP routing identifier in a BAP header and adding to a BAP SDU (IP packet) to establish a BAP data PDU, and performing a transmission operation according to an existing technique.

Embodiments of a Ninth Aspect

The embodiments of this disclosure provides a communication system, with contents identical to those in the embodiments of the first to eighth aspects being not going to be described herein any further.

In some embodiments, the communication system may include an IAB-donor-node, including the information transceiving apparatus as described in the embodiments of the sixth aspect, which executes the information transceiving method as described in the embodiments of the first aspect.

In some embodiments, the communication system may include a boundary IAB-node, including the data transmission apparatus as described in the embodiments of the seventh aspect, which executes the data transmission method as described in the embodiments of the second aspect.

In some embodiments, the communication system may include an IAB-node or a donor-DU node, including the information transceiving apparatus as described in the embodiments of the eighth aspect, which executes the information transceiving method as described in the embodiments of the third or fourth or fifth aspect. The above implementations may be executed separately, or may be executed in a combined manner, and the embodiment of this disclosure is not limited thereto.

Wherein, the IAB node (including the boundary IAB nodes) may include an IAB-DU functional unit, and may further include an IAB-MT functional unit. Wherein, the IAB-MT functional unit may have a structure identical to a terminal equipment, and the IAB-DU/CU functional unit may have a structure identical to a network device.

Figure 22:
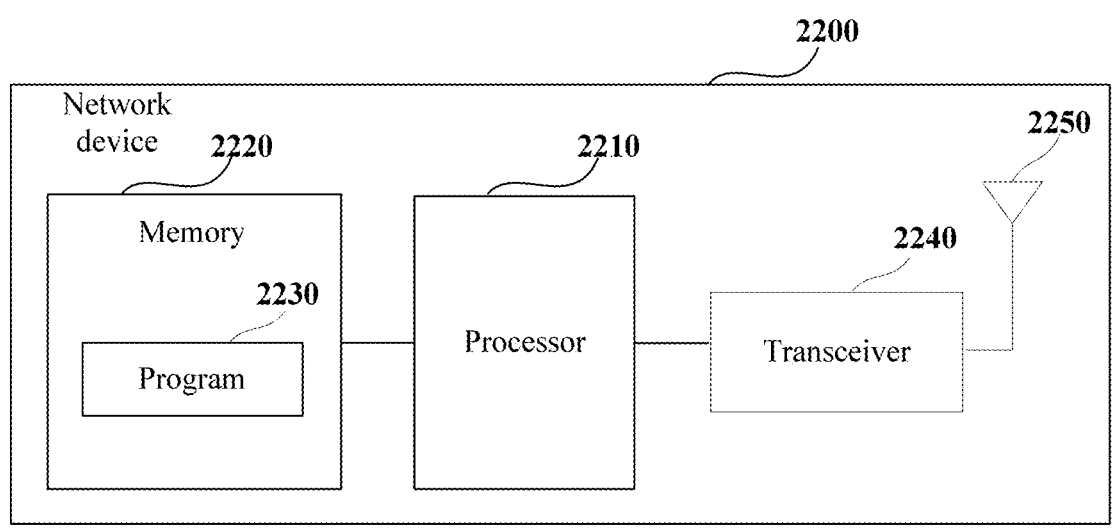
FIG. 22 is a schematic diagram of the network device of an embodiment of this disclosure.

FIG. 22 is a schematic diagram of a structure of the network device of the embodiment of this disclosure. As shown in FIG. 22, the network device 2200 may include a processor 2210 (such as a central processing unit (CPU)) and a memory 2220, the memory 2220 being coupled to the processor 2210. Wherein, the memory 2220 may store various data, and furthermore, it may store a program 2230 for information processing, and execute the program 2230 under control of the processor 2210.

For example, the processor 2210 may be configured to execute a program to carry out the method executed by the IAB-donor-node in the embodiments of the first aspect, or the method executed by the third IAB-node in the embodiments of the second or third aspect, or the method executed by the fourth IAB-node in the embodiments of the fourth aspect, or the method executed by the sixth node in the embodiments of the fifth aspect.

Furthermore, as shown in FIG. 22, the network device 2200 may include a transceiver 2240, and an antenna 2250, etc. Wherein, functions of the above components are similar to those in the related art, and shall not be described herein any further. It should be noted that the network device 2200 does not necessarily include all the parts shown in FIG. 22, and furthermore, the network device 2200 may include parts not shown in FIG. 22, and the related art may be referred to.

Figure 23:
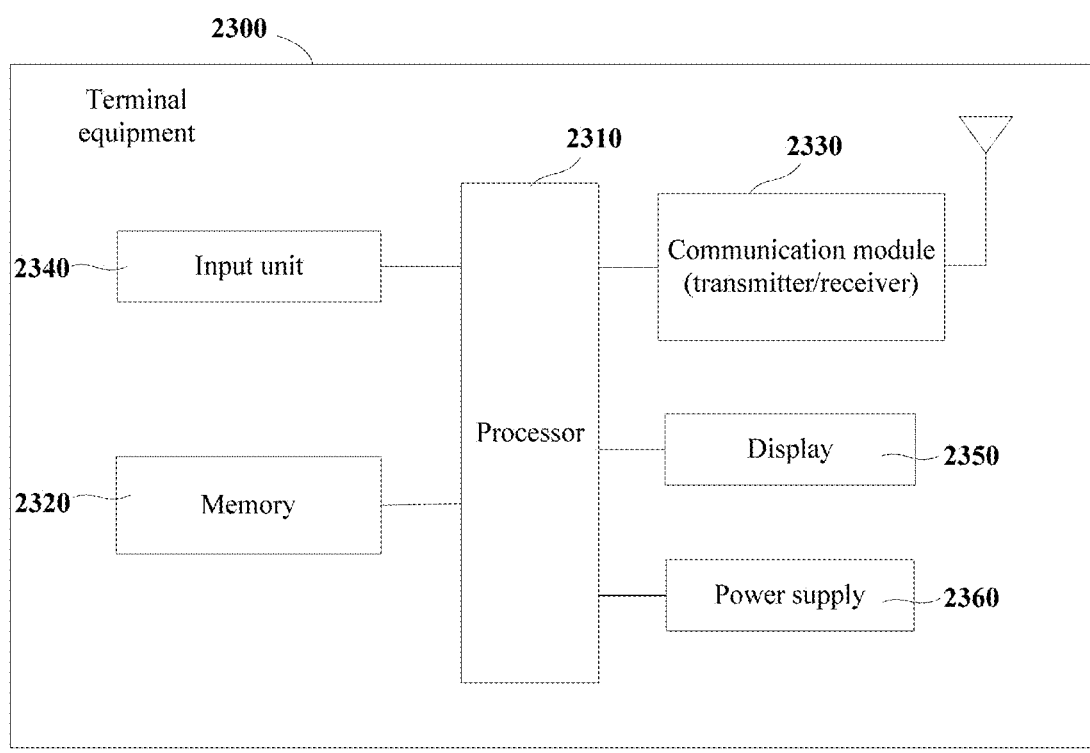
FIG. 23 is a schematic diagram of the terminal equipment of an embodiment of this disclosure.

FIG. 23 is a schematic diagram of the terminal equipment in the embodiment of this disclosure. As shown in FIG. 23, the terminal equipment 2300 may include a processor 2310 and a memory 2320, the memory 2320 storing data and a program and being coupled to the processor 2310. It should be noted that this figure is illustrative only, and other types of structures may also be used, so as to supplement or replace this structure and achieve a telecommunications function or other functions. For example, the processor 2310 may be configured to execute a program to carry out the method executed by the third IAB-node in the embodiments of the second or third aspect, or the method executed by the fourth IAB-node in the embodiments of the fourth aspect, or the method executed by the sixth node in the embodiments of the fifth aspect.

As shown in FIG. 23, the terminal equipment 2300 may further include a communication module 2330, an input unit 2340, a display 2350, and a power supply 2360; wherein functions of the above components are similar to those in the related art, which shall not be described herein any further. It should be noted that the terminal equipment 2300 does not necessarily include all the parts shown in FIG. 23, and the above components are not necessary. Furthermore, the terminal equipment 2300 may include parts not shown in FIG. 23, and the related art may be referred to.

An embodiment of this disclosure provides a computer readable program code, which, when executed in an IAB-node, will cause the IAB-node to carry out the information transceiving method as described in any one of the embodiments of the first and the third to the fifth aspects.

An embodiment of this disclosure provides a computer readable medium, including a computer readable program code, which will cause an IAB-node to carry out the information transceiving method as described in any one of the embodiments of the first and the third to the fifth aspects.

An embodiment of this disclosure provides a computer readable program code, which, when executed in an IAB-node, will cause the IAB-node to carry out the data transmission method as described in the embodiment of the second aspect.

An embodiment of this disclosure provides a computer readable medium, including a computer readable program code, which will cause an IAB-node to carry out the data transmission method as described in the embodiment of the second aspect.

The above apparatuses and methods of this disclosure may be implemented by hardware, or by hardware in combination with software. This disclosure relates to such a computer-readable program that when the program is executed by a logic device, the logic device is enabled to carry out the apparatus or components as described above, or to carry out the methods or steps as described above. This disclosure also relates to a storage medium for storing the above program, such as a hard disk, a floppy disk, a CD, a DVD, and a flash memory, etc.

The methods/apparatuses described with reference to the embodiments of this disclosure may be directly embodied as hardware, software modules executed by a processor, or a combination thereof. For example, one or more functional block diagrams and/or one or more combinations of the functional block diagrams shown in the drawings may either correspond to software modules of procedures of a computer program, or correspond to hardware modules. Such software modules may respectively correspond to the steps shown in the drawings. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in the drawings may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in the drawings may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the spirits and principle of the present disclosure, and such variants and modifications fall within the scope of the present disclosure.

As to implementations containing the above embodiments, following supplements are further disclosed.

1. An information transceiving method, comprising:
   receiving, by a first IAB-donor-node, a second message transmitted by a second IAB-donor-node, the second message comprising a BAP address of a second node in topology of the second IAB-donor-node and/or a second path identifier in topology of the second IAB-donor-node and/or a first virtual BAP address of a first node in topology of the first IAB-donor-node; and/or,
   transmitting a first message by the first IAB-donor-node to the second IAB-donor-node, the first message comprising a BAP address of a first node in topology of the first IAB-donor-node; and
   configuring a routing table by the first IAB-donor-node for nodes in its topology.

2. The method according to supplement 1, wherein the method further comprises:
   generating a second virtual BAP address by the first IAB-donor-node for the second node.

3. The method according to supplement 1, wherein the routing table comprises a routing identifier, the routing identifier comprising the BAP address of the second node and a first path identifier in the topology of the first IAB-donor-node, or comprising the second virtual BAP address and a first path identifier in the topology of the first IAB-donor-node.

4. The method according to supplement 1 or 2, wherein the first message and the second message are carried by XnAP signaling.

5. The method according to any one of supplements 1-4, wherein the method further comprises:
   transmitting routing mapping relationship configuration information by the first IAB-donor-node to a third IAB-node, the routing mapping relationship configuration information indicating a correspondence between a first routing identifier taken as an ingress routing identifier in the topology of the first IAB-donor-node and a second routing identifier taken as an egress routing identifier in the topology of the second IAB-donor-node.

6. The method according to any one of supplements 1-4, wherein the method further comprises:
   transmitting routing mapping relationship configuration information by the first IAB-donor-node to the third IAB-node, the routing mapping relationship configuration information indicating a correspondence between a second routing identifier taken as an ingress routing identifier in the topology of the second IAB-donor-node and a first routing identifier taken as an egress routing identifier in the topology of the first IAB-donor-node.

7. The method according to supplement 5, wherein the first routing identifier comprises the BAP address of the second node, and the second routing identifier comprises the BAP address of the second node and the second path identifier; or, the first routing identifier comprises the second virtual BAP address, and the second routing identifier comprises the BAP address of the second node and the second path identifier.

8. The method according to supplement 7, wherein the first routing identifier further comprises the first path identifier in the topology of the first IAB-donor-node.

9. The method according to supplement 6, wherein the first routing identifier comprises the BAP address of the first node, and the second routing identifier comprises the first virtual BAP address.

10. The method according to supplement 9, wherein the first routing identifier further comprises the first path identifier in the topology of the first IAB-donor-node, and/or the second routing identifier further comprises the second path identifier in the topology of the second IAB-donor-node.

11. The method according to any one of supplements 5-10, wherein the routing mapping relationship configuration information is carried by F1AP signaling.

12. An information transceiving method, comprising:
transmitting a second message by a second IAB-donor-node to a first IAB-donor-node, the second message comprising a BAP address of a second node in topology of the second IAB-donor-node and/or a second path identifier in topology of the second IAB-donor-node and/or a first virtual BAP address of a first node in topology of the first IAB-donor-node; and/or,
receiving, by the second IAB-donor-node, a first message transmitted by the first IAB-donor-node, the first message comprising a BAP address of a first node in topology of the first IAB-donor-node; and
configuring a routing table by the second IAB-donor-node for other nodes in its topology.

13. The method according to supplement 11, wherein the method further comprises:
generating the first virtual BAP address by the second IAB-donor-node for the first node.

14. The method according to supplement 12 or 13, wherein the routing table comprises a routing identifier, the routing identifier comprising the first virtual BAP address and the second path identifier.

15. The method according to supplement 12, wherein the first message and the second message are carried by XnAP signaling.

16. An information transceiving method, comprising:
receiving a BAP packet by a third IAB-node;
performing routing identifier rewriting on a BAP header in the BAP packet by the third IAB-node according to routing mapping relationship configuration information when a predetermined condition is satisfied, wherein the rewriting includes replacing a routing identifier in the BAP header with an egress routing identifier in the routing mapping relationship configuration information; and
forwarding the rewritten BAP packet by the third IAB-node.

17. The method according to supplement 16, wherein the predetermined condition is that a destination address in the BAP packet is not a BAP address of the third IAB-node, and the routing identifier in the BAP header corresponds to the ingress routing identifier in the routing mapping relationship configuration information.

18. The method according to supplement 16, wherein the predetermined condition is that a destination address in the BAP packet is neither a BAP address of the third IAB-node nor a virtual BAP address corresponding to BAP address of the third IAB-node in the routing mapping relationship configuration information, and the routing identifier in the BAP header corresponds to the ingress routing identifier in the routing mapping relationship configuration information.

19. The method according to supplement 16, wherein the predetermined condition is that the BAP packet is from an IAB child node link or from a link of a parent node leading to the second IAB-donor-node, and a destination address in the BAP packet is neither a BAP address of the third IAB-node nor a virtual BAP address corresponding to BAP address of the third IAB-node in the routing mapping relationship configuration information, and the routing identifier in the BAP header corresponds to the ingress routing identifier in the routing mapping relationship configuration information.

20. The method according to supplement 16, wherein when the destination address in the BAP packet is the BAP address of the third IAB-node or the virtual BAP address corresponding to the third IAB-node in the routing mapping relationship configuration information, the third IAB-node transmits a BAP SDU with a BAP header being deleted to an upper layer.

21. The method according to any one of supplements 17-20, wherein the BAP address of the third IAB node is allocated by the first IAB-donor-node, or is allocated by the second IAB-donor-node.

22. The method according to supplement 16, wherein when the destination address in the BAP packet is a BAP address allocated by the first IAB-donor-node for the third IAB-node or a BAP address allocated by the second IAB-donor-node for the third IAB-node, the third IAB-node transmits a BAP SDU with a BAP header being deleted to an upper layer.

23. The method according to any one of supplements 16-22, wherein the method further comprises:
receiving, by the third IAB-node, routing mapping relationship configuration information transmitted by the first IAB-donor-node, the routing mapping relationship configuration information indicating a correspondence between a first routing identifier as an ingress routing identifier in the topology of the first IAB-donor-node and a second routing identifier as an egress routing identifier in the topology of the second IAB-donor-node.

24. The method according to any one of supplements 16-19, wherein the method further comprises:
receiving, by the third IAB-node, routing mapping relationship configuration information transmitted by the first IAB-donor-node, the routing mapping relationship configuration information indicating a correspondence between a second routing identifier as an ingress routing identifier in the topology of the second IAB-donor-node and a first routing identifier as an egress routing identifier in the topology of the first IAB-donor-node.

25. The method according to supplement 23, wherein the first routing identifier comprises the BAP address of the second node, and the second routing identifier comprises the BAP address of the second node and the second path identifier, or, the first routing identifier comprises the second virtual BAP address, and the second routing identifier includes the BAP address of the second node and the second path identifier.

26. The method according to supplement 25, wherein the first routing identifier further comprises the first path identifier within the topology of the first IAB-donor-node.

27. The method according to supplement 24, wherein the first routing identifier comprises the BAP address of the first node, and the second routing identifier comprises the first virtual BAP address.

28. The method according to supplement 27, wherein the first routing identifier further comprises a first path identifier within the topology of the first IAB-donor-node, and/or the second routing identifier further comprises a second path identifier within the topology of the second IAB-donor-node.

29. The method according to any one of supplements 23-28, wherein the routing mapping relationship configuration information is carried by F1AP signaling.

30. The method according to any one of supplements 16-29, wherein the method further comprises:
receiving, by the third node, first allocation information of a BAP address allocated by the first IAB-donor-node for it and second allocation information of a BAP address allocated by the second IAB-donor-node for it.

31. The method according to supplement 30, wherein the first allocation information and the second allocation information are carried by an RRC message.

32. The method according to supplement 17, wherein when the BAP packet is a BAP packet from an IAB child node, the step of forwarding comprises: selecting an egress link for routing, the egress link corresponding to a parent node with a BAP address not appearing in a next hop of node contained in a routing table, or, in a case where a master base station is taken as a first IAB-donor-node of the third IAB-node, selecting a parent node link for routing, the parent node link corresponding to a secondary cell group (SCG), and in a case where a secondary base station is taken as the first IAB-donor-node of the third IAB-node, selecting a parent node link for routing, the parent node link corresponding to a master cell group (MCG).

33. An information transceiving method, comprising:
receiving, by a fourth IAB node, routing table information transmitted by a first IAB-donor-node, the routing table comprising a routing identifier, the routing identifier including a BAP address of a second node in topology of a second IAB-donor-node and a first path identifier in topology of the first IAB-donor-node,
or, the routing identifier comprising the second virtual BAP address and a first path identifier within the topology of the first IAB-donor-node, the second virtual BAP address being a virtual BAP address generated by the first IAB-donor-node for the second node.

34. An information transceiving apparatus, applicable to a fourth IAB-node, comprising:
a sixth receiving unit configured to receive routing table information transmitted by a first IAB-donor-node, the routing table comprising a routing identifier, the routing identifier including a BAP address of a second node in topology of a second IAB-donor-node and a first path identifier in topology of the first IAB-donor-node,
or, the routing identifier comprising the second virtual BAP address and a first path identifier within the topology of the first IAB-donor-node, the second virtual BAP address being a virtual BAP address generated by the first IAB-donor-node for the second node.

35. An information transceiving method, comprising:
receiving, by a sixth node, routing table information transmitted by a second IAB-donor-node, the routing table including a routing identifier, the routing identifier including a first virtual BAP address and a second path identifier within topology of the second IAB-donor-node, the first virtual BAP address being a virtual BAP address generated by the second IAB-donor-node for a first node within topology of a first IAB-donor-node.

36. An information transceiving apparatus, applicable to a sixth node, comprising:
a seventh receiving unit configured to receive routing table information transmitted by a second IAB-donor-node, the routing table comprising a routing identifier, the routing identifier comprising a first virtual BAP address and a second path identifier within topology of the second IAB-donor-node, the first virtual BAP address being a virtual BAP address generated by the second IAB-donor-node for a first node within topology of a first IAB-donor-node.

37. An information transceiving method, comprising:
receiving, by a third IAB-node, routing mapping relationship configuration information transmitted by a first IAB-donor-node, the routing mapping relationship configuration information indicating a correspondence between a first routing identifier as an ingress routing identifier within a topology of the first IAB-donor-node and a second routing identifier as an egress routing identifier in a topology of a second IAB-donor-node, or,
receiving, by a third IAB-node, routing mapping relationship configuration information transmitted by a first IAB-donor-node, the routing mapping relationship configuration information indicating a correspondence between a second routing identifier as an ingress routing identifier within a topology of a second IAB-donor-node and a first routing identifier as an egress routing identifier in a topology of the first IAB-donor-node.

38. The method according to supplement 37, wherein the first routing identifier comprises the BAP address of the second node, and the second routing identifier comprises the BAP address of the second node and the second path identifier, or,
the first routing identifier comprises the second virtual BAP address, and the second routing identifier comprises the BAP address of the second node and the second path identifier.

39. The method according to supplement 38, wherein the first path identifier further comprises a firs routing identifier within the topology of the first IAB-donor-node.

40. The method according to supplement 37, wherein the first routing identifier comprises the first routing identifier comprises the BAP address of the first node, and the second routing identifier comprises the first virtual BAP address.

41. The method according to supplement 40, wherein the first routing identifier further comprises the first path identifier within the topology of the first IAB-donor-node, and/or the second routing identifier further comprises the second path identifier within the topology of the second IAB-donor-node.

42. The method according to any one of supplements 37-41, wherein the routing mapping relationship configuration information is carried by F1AP signaling.

43. An information transceiving apparatus, applicable to a third IAB-node, the apparatus comprising:
a fifth receiving unit configured to receive routing mapping relationship configuration information transmitted by a first IAB-donor-node, the routing mapping relationship configuration information indicating a correspondence between a first routing identifier as an ingress routing identifier within topology of the first IAB-donor-node and a second routing identifier as an egress routing identifier in topology of a second IAB-donor-node, or, receive routing mapping relationship configuration information transmitted by a first IAB-donor-node, the routing mapping relationship configuration information indicating a correspondence between a second routing identifier as an ingress routing identifier within topology of a second IAB-donor-node and a first routing identifier as an egress routing identifier in topology of the first IAB-donor-node.

44. An IAB-donor-node, comprising a memory and a processor, wherein the memory stores a computer program, and the processor is configured to execute the computer program to carry out the information transceiving method as described in any one of supplements 1-15.

45. An IAB-node, comprising a memory and a processor, wherein the memory stores a computer program, and the processor is configured to execute the computer program to carry out the data transmission method as described in any one of supplements 16-32.

46. An IAB-node, comprising a memory and a processor, wherein the memory stores a computer program, and the processor is configured to execute the computer program to carry out the information transceiving method as described in any one of supplements 33, 35 and 37-42.

47. A communication system, comprising:
an IAB-donor-node configured to carry out the information transceiving method as described in any one of supplements 1-15.

48. A communication system, comprising:
an IAB-node configured to carry out the data transmission method as described in any one of supplements 16-32.

49. A communication system, comprising:
an IAB-node configured to carry out the information transceiving method as described in any one of supplements 33, 35 and 37-42.

What is claimed is:

1. An information transceiving apparatus, applicable to a first IAB (Integrated Access and Backhaul)-donor-node, the apparatus comprises: a transmitter configured to transmit a first message to a second IAB-donor-node, the first message comprising a BAP (Backhaul Adaptation Protocol) address of a first node in topology of the first IAB-donor-node; and a receiver configured to receive a second message transmitted by the second IAB donor node, the second message comprising a BAP Backhaul Adaptation Protocol) Routing ID in topology of the second IAB donor node;
and a processor configured to configure BAP routing entries for nodes in its topology according to the second message.

2. The apparatus according to claim 1, wherein:
the first IAB donor node is an F1-terminating donor of a third IAB node, and the second IAB donor node is a non-F1-terminating donor of the third IAB node.

3. The apparatus according to claim 2, wherein:
the third IAB node is a boundary IAB node, and the third IAB node needs to establish inter-donor topology redundancy for traffic offload from the F1-terminating donor to the non-F1-terminating donor.

4. The apparatus according to claim 1, wherein the BAP routing entries comprise a BAP Routing ID, the BAP Routing ID comprising a BAP address of an IAB-donor-DU in the topology of the second IAB-donor-node.

5. The apparatus according to claim 1, wherein the first message and the second message are carried by XnAP signaling.

6. The apparatus according to claim 2, wherein the transmitter further transmits routing mapping relationship configuration information configured according to the second message to the third IAB-node, wherein
the routing mapping relationship configuration information indicating a correspondence between a first routing ID in the topology of the first IAB donor node taken as an ingress routing ID and a second routing ID in the topology of the second IAB-donor-node taken as an egress routing ID; or
the routing mapping relationship configuration information indicating a correspondence between a second routing ID in the topology of the second IAB-donor-node taken as an ingress routing ID and a first routing ID in the topology of the first IAB-donor-node taken as an egress routing ID.

7. The apparatus according to claim 6, wherein the routing mapping relationship configuration information is carried by F1AP signaling.

8. The apparatus according to claim 7, wherein the F1AP signaling comprises:
one or multiple information elements included in BAP MAPPING CONFIGURATION message to add and/or remove the routing mapping relationship configuration information.

9. The apparatus according to claim 8, wherein the one or multiple information elements comprise:
an Ingress BAP Routing ID representing the BAP Routing ID to be rewritten; and
an Egress BAP Routing ID representing the BAP Routing ID used to write in BAP header.

10. The apparatus according to claim 2, wherein the processer configures the BAP routing entries for descendant nodes of the third IAB node.

11. The apparatus according to claim 2, wherein the processor further configures a mapping information of an uplink traffic type to the BAP Routing ID on descendant nodes of the third IAB node.

12. The apparatus according to claim 11, wherein the BAP Routing ID includes a BAP address of an IAB-donor-DU in the topology of the second IAB donor node.

13. An information transceiving apparatus, applicable to a second IAB (Integrated Access and Backhaul)-donor-node, the apparatus comprises: a receiver configured to receive a first message transmitted by the first IAB-donor-node, the first message comprising a BAP (Backhaul Adaptation Protocol) address of a first node in topology of the first IAB-donor-node; a transmitter configured to transmit a second message to a first IAB donor node, the second message comprising a BAP Routing ID in topology of the second IAB donor node; and a processor configured to configure BAP routing entries for nodes in its topology.

14. The apparatus according to claim 13, wherein the processor further configures a mapping of an IP header information to the BAP Routing ID for downlink traffic on an IAB-donor-DU in the topology of the second IAB donor node.

15. The apparatus according to claim 14, wherein the mapping is carried in IP-to-layer-2 traffic mapping Information List information element in a BAP MAPPING CONFIGURATION message via F1AP signaling.

16. A data transmission apparatus, applicable to a third IAB (Integrated Access and Backhaul)-node, the apparatus comprises: a third receiver configured to receive a BAP (Backhaul Adaptation Protocol) Data PDU (Protocol Data Unit); rewriting processor circuitry configured to perform BAP Routing ID rewriting on a BAP header in the BAP Data PDU according to routing mapping relationship configuration information when a predetermined condition is satisfied, wherein the rewriting processor circuitry replaces a BAP Routing ID in the BAP header with an Egress BAP Routing ID in the routing mapping relationship configuration information; and forwarding processor circuitry configured to forward the rewritten BAP Data PDU.

17. The apparatus according to claim 16, wherein the predetermined condition is that a DESTINATION field in the BAP Data PDU is not a BAP address of the third IAB node, and the BAP Routing ID in the BAP header matches the Ingress BAP Routing ID in the routing mapping relationship configuration information.

18. The apparatus according to claim 17, wherein the BAP address of the third IAB node is allocated by the second IAB donor node via RRCReconfiguration message.

19. The apparatus according to claim 16, wherein when a DESTINATION field in the BAP Data PDU is the BAP address of the third IAB node, the third IAB node transmits a BAP SDU with a BAP header being removed to an upper layer.

\* \* \* \* \*